United States Patent
Zhang et al.

(10) Patent No.: US 11,611,617 B2
(45) Date of Patent: Mar. 21, 2023

(54) DISTRIBUTED DATA STORE WITH PERSISTENT MEMORY

(71) Applicant: Purdue Research Foundation, West Lafayette, IN (US)

(72) Inventors: Yiying Zhang, San Diego, CA (US); Shin-Yeh Tsai, Menlo Park, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/903,182

(22) Filed: Jun. 16, 2020

(65) Prior Publication Data
US 2020/0396288 A1  Dec. 17, 2020

Related U.S. Application Data

(60) Provisional application No. 62/862,089, filed on Jun. 16, 2019.

(51) Int. Cl.
*H04L 67/1097* (2022.01)
*G06F 15/173* (2006.01)
*G06F 3/06* (2006.01)

(52) U.S. Cl.
CPC .......... *H04L 67/1097* (2013.01); *G06F 3/065* (2013.01); *G06F 3/067* (2013.01);
(Continued)

(58) Field of Classification Search
CPC .......... H04L 67/1097; G06F 15/17331; G06F 3/0635; G06F 3/0638; G06F 3/061; G06F 3/067
See application file for complete search history.

(56) References Cited

U.S. PATENT DOCUMENTS 6,148,361 A * 11/2000 Carpenter ............. G06F 9/4812
710/265
7,620,693 B1 * 11/2009 Mott ................... H04L 67/1097
709/213
(Continued)

OTHER PUBLICATIONS

GeeksforGeeks definition of RDMA; (found at https://www.geeksforgeeks.org/remote-direct-memory-access-rdma); published Jun. 2, 2020; (Year: 2020).*

(Continued)

*Primary Examiner* — Prasith Thammavong
(74) *Attorney, Agent, or Firm* — Piroozi-IP, LLC

(57) ABSTRACT

A method to build a persistent memory (PM)-based data storage system without involving a processor (CPU) at storage nodes is disclosed which includes storing data in one or more storage nodes that only include PM and no CPUs, with data stored in PM in form of link lists, accessing data stored in the one or more storage nodes' PM directly by remote compute nodes through a network, maintaining metadata associated with the data by one or more global controllers (metadata servers), upon request by a user to read or write data, the compute nodes contacting the one or more metadata servers to obtain location of data of interest in form of pointers (shortcuts), and the compute nodes sending network requests directly to the one or more storage nodes' PM to locate latest version of data by tracing the link list from the associated shortcut to corresponding tails.

5 Claims, 15 Drawing Sheets

(52) U.S. Cl.
 CPC .......... *G06F 3/0635* (2013.01); *G06F 3/0638* (2013.01); *G06F 15/17331* (2013.01)

(56) References Cited

U.S. PATENT DOCUMENTS

| | | | | |
|---|---|---|---|---|
| 7,756,943 | B1* | 7/2010 | Wong | G06F 9/544 709/212 |
| 7,836,329 | B1* | 11/2010 | Singhal | G06F 11/2294 714/4.1 |
| 8,589,550 | B1* | 11/2013 | Faibish | G06F 3/0662 709/225 |
| 2005/0028026 | A1* | 2/2005 | Shirley | G06F 11/1464 714/6.3 |
| 2006/0045005 | A1* | 3/2006 | Blackmore | H04L 1/0079 370/216 |
| 2008/0189382 | A1* | 8/2008 | Duzett | G06F 13/4022 709/212 |
| 2009/0228635 | A1* | 9/2009 | Borkenhagen | G06F 12/08 711/E12.001 |
| 2012/0310987 | A1* | 12/2012 | Dragojevic | G06F 9/467 707/792 |
| 2012/0311021 | A1* | 12/2012 | Zhu | G06F 11/1453 709/203 |
| 2015/0089162 | A1* | 3/2015 | Ahsan | G06F 13/1684 711/147 |
| 2017/0255590 | A1* | 9/2017 | Shuler | G06F 9/526 |
| 2018/0052780 | A1* | 2/2018 | Khatib | G06F 13/1673 |
| 2018/0343131 | A1* | 11/2018 | George | G06F 12/08 |
| 2020/0042199 | A1* | 2/2020 | Rozas | H04L 67/2842 |
| 2020/0045134 | A1* | 2/2020 | Rozas | H04L 67/325 |
| 2020/0057679 | A1* | 2/2020 | Goodacre | G06F 9/5027 |

OTHER PUBLICATIONS

Hosomi et al., A Novel Nonvolatile Memory with Spin Torque Transfer Magnetization Switching: Spin-RAM. Electron Devices Meeting, 2005. IEDM Technical Digest IEEE International, pp. 459-462, 2005.
Infiniband Trade Association. InfiniBand Architecture Specification, 2015.
Handy, Understanding the intel/micron 3dxpoint memory. Storage Developer Conference, SNIA, Santa Clara, 2015.
Kalia et al., Datacenter rpcs can be general and fast. 16th USENIX Symposium on Networked Systems Design and Implementation (NSDI '19), Boston, MA, USA, Feb. 2019.
Kalia et al., Using RDMA Efficiently for Key-value Services. Proceedings of the 2014 ACM Conference on Special Interest Group on Data Communication (SIGCOMM '14), Chicago, IL, USA, Aug. 2014.
Kalia et al., Design Guidelines for High Performance RDMA Systems. Proceedings of the 2016 USENIX Annual Technical Conference (ATC '16), Denver, CO, USA, Jun. 2016.
Kalia et al., FaSST: Fast, Scalable and Simple Distributed Transactions with Two-Sided (RDMA) Datagram RPCs. 12th USENIX Symposium on Operating Systems Design and Implementation (OSDI '16), Savanah, GA, USA, 2016.
Keleher et al., Lazy Release Consistency for Software Distributed Shared Memory. Proceedings of the 19th Annual International Symposium on Computer Architecture (ISCA '92), Queensland, Australia, May 1992.
Kim et al., Freeflow: Software-based virtual RDMA networking for containerized clouds. 16th USENIX Symposium on Networked Systems Design and Implementation (NSDI '19), Boston, MA, USA, 2019 2019.
Kim et al., Sparkle: Optimizing spark for large memory machines and analytics. Proceedings of the 2017 Symposium on Cloud Computing (SoCC '17), Santa Clara, CA, USA, Sep. 2017.
Binnig et al., The End of Slow Networks: It's Time for a Redesign. Proceedings of the VLDB Endowment, 9(7):528-539, 2016.

Lee et al., Phase Change Memory Architecture and the Quest for Scalability. Communications of the ACM, 53(7):99-106, 2010.
Lee et al., Phase-change technology and the future of main memory. IEEE micro, 30(1):143, 2010.
Lee et al., A Fast, High-Endurance and Scalable Non-Volatile Memory Device Made from Asymmetric Ta2Q(5-x)/TaO 2-x) Bilayer Structures. Nature materials, 10(8):625-630, 2011.
Li et al., KV-Direct: High-Performance In-Memory Key-Value Store with Programmable NIC. Proceedings of the 26th Symposium on Operating Systems Principles (SOSP '17), Shanghai, China, Oct. 2017.
Lim et al., Disaggregated memory for expansion and sharing in blade servers. Proceedings of the 36th Annual International Symposium on Computer Architecture (ISCA '09), Austin, Texas, 2009.
Lim et al., System-level implications of disaggregated memory. Proceedings of the 2012 IEEE 18th International Symposium on High-Performance Computer Architecture (HPCA '12), New Orleans, LA, USA, Feb. 2012.
Lu et al., Octopus: an rdma-enabled distributed persistent memory file system. USENIX Annual Technical Conference (ATC '17), Santa Clara, CA, USA, Jul. 2017.
Mitchell et al., Using Onesided RDMA Reads to Build a Fast, CPU-efficient Key-value Store. Proceedings of the 2013 USENIX Annual Technical Conference (ATC '13), San Jose, CA, USA, Jun. 2013.
Aguilera et al., Remote regions: a simple abstraction for remote memory. USENIX Annual Technical Conference (ATC '18), Boston, MA, Jul. 2018.
Atikoglu et al., Workload Analysis of a Large-scale Key-value Store. Proceedings of the 12th ACM SIGMETRICS/Performance Joint International Conference on Measurement and Modeling of Computer Systems (SIGMETRICS 12), London, UK, Jun. 2012.
Berger et al., Hoard: A scalable memory allocator for multithreaded applications. Proceedings of the Ninth International Conference on Architectural Support for Programming Languages and Operating Systems (ASPLOS '00), Cambridge, MA, USA, Nov. 2000.
Bisiani et al., Plus: A Distributed Shared-Memory System. Proceedings of the 17th Annual International Symposium on Computer Architecture (ISCA '90), Seattle, Washington, May 1990.
Blott et al., Achieving 10gbps line-rate key-value stores with fpgas. The 5th USENIX Workshop on Hot Topics in Cloud Computing (HotCloud '13), San Jose, CA, USA, Jun. 2013.
Blott et al., Scaling out to a single-node 80gbps memcached server with 40terabytes of memory. Proceedings of the 7th USENIX Conference on Hot Topics in Storage and File Systems (Hot-Storage '15), Santa Clara, CA, Jul. 2015.
Chen et al., Efficient data supply for hardware accelerators with prefetching and access/execute decoupling. The 49th Annual IEEE/ACM International Symposium on Microarchitecture (MICRO-49), Taipei, Taiwan, Oct. 2016.
Chen et al., Fast and general distributed transactions using rdma and htm. Proceedings of the Eleventh European Conference on Computer Systems (EUROSYS '16), London, UK, Apr. 2016.
Cooper et al., Benchmarking Cloud Serving Systems with YCSB. Proceedings of the 1st ACM Symposium on Cloud Computing (SoCC '10), New York, New York, Jun. 2010.
Daglis et al., Atomic object reads for in-memory rack-scale computing. 49th Annual IEEE/ACM International Symposium on Microarchitecture (MICRO '16), Taipei, Taiwan, Oct. 2016.
Dragojevi'c et al., FaRM: Fast Remote Memory. Proceedings of the 11th USENIX Conference on Networked Systems Design and Implementation (NSDI '14), Seattle, WA, USA, Apr. 2014.
Dragojevi'c et al., No Compromises: Distributed Transactions with Consistency, Availability, and Performance. Proceedings of the 25th Symposium on Operating Systems Principles (SOSP '15), Monterey, CA, USA, Oct. 2015.
Eisenman et al., Reducing dram footprint with nvm in facebook. Proceedings of the Thirteenth EuroSys Conference (EuroSys '18), Porto, Portugal, Apr. 2018.
Faraboschi et al., Beyond processor-centric operating systems. 15th Workshop on Hot Topics in Operating Systems (HotOS '15), Kartause Ittingen, Switzerland, May 2015.

(56) References Cited

OTHER PUBLICATIONS

Firestone et al., Azure accelerated networking: Smartnics in the public cloud. In Proceedings of the 15th USENIX Conference on Networked Systems Design and Implementation (NSDI '18), Renton, WA, USA, Apr. 2018.

Fitzpatrick, Distributed Caching with Memcached. Linux Journal, 2004(124):5, 2004.

Fleisch et al., Mirage: A Coherent Distributed Shared Memory Design. Proceedings of the 12th ACM Symposium on Operating Systems Principles (SOSP '89), Litchfield Park, Arizona, Dec. 1989.

Gu et al., Efficient Memory Disaggregation with Infiniswap. Proceedings of the 14th USENIX Symposium on Networked Systems Design and Implementation (NSDI '17), Boston, MA, USA, Apr. 2017.

Guo et al., RDMA over Commodity Ethernet at Scale. Proceedings of the 2016 ACM Conference on Special Interest Group on Data Communication (SIGCOMM '16), Florianopolis, Brazil, Aug. 2016.

Wei et al., Replication-driven live reconfiguration for fast distributed transaction processing. USENIX Annual Technical Conference (ATC '17), Santa Clara, CA, Jul. 2017.

Wei et al., Fast in-memory transaction processing using RDMA and HTM. Proceedings of the 25th Symposium on Operating Systems Principles (SOSP '15), Monterey, CA, USA, Oct. 2015.

Wu et al., An empirical evaluation of in-memory multi-version concurrency control. Proceedings of the VLDB Endowment, 10(7):781-792, Mar. 2017.

Xue et al., Adaptive memory fusion: Towards transparent, agile integration of persistent memory. IEEE International Symposium on High Performance Computer Architecture (HPCA '18), Vienna, Austria, Feb. 2018.

Yang et al., Memristive devices for computing. Nature nanotechnology, 8(1):13-24, 2013.

Yang et al., Orion: A distributed file system for non-volatile main memory and rdmacapable networks. 17th USENIX Conference on File and Storage Technologies (FAST '19), Boston, MA, USA, Feb. 2019.

Zamanian et al., The End of a Myth: Distributed Transactions Can Scale. Proceedings of the VLDB Endowment, 10(6):685-696, 2017.

Zhang et al., Mojim: A Reliable and Highly-Available Non-Volatile Memory System. Proceedings of the 20th International Conference on Architectural Support for Programming Languages and Operating Systems (ASPLOS '15), Istanbul, Turkey, Mar. 2015.

Golander et al., Persistent Memory over Fabric (PMoF). SNIA PM Summit, Jan. 24, 2018.

Mitchell et al., Balancing cpu and network in the cell distributed b-tree store. Proceedings of the 2016 USENIX Conference on Usenix Annual Technical Conference (ATC '16), Denver, CO, USA, Jun. 2016.

Mittal et al., Revisiting network support for rdma. Proceedings of the 2018 Conference of the ACM Special Interest Group on Data Communication (SIGCOMM '18), Budapest, Hungary, Aug. 2018.

Nelson et al., Latency-Tolerant Software Distributed Shared Memory. Proceedings of the 2015 USENIX Annual Technical Conference (ATC '15), Santa Clara, CA, USA, Jul. 2015.

Nishtala et al., Scaling Memcache at Facebook. Proceedings of the 10th USENIX Symposium on Networked Systems Design and Implementation (NSDI '13), Lombard, IL, Apr. 2013.

Ousterhout et al., The ramcloud storage system. ACM Transactions Computer System, 33(3)7:1-7:55, Aug. 2015.

Zhou et al., Performance Evaluation of Two Home-based Lazy Release Consistency Protocols for Shared Virtual Memory Systems. Proceedings of the Second USENIX Symposium on Operating Systems Design and Implementation, OSDI '96, Seattle, Washington, USA, 1996.

Pugh, Skip lists: A probabilistic alternative to balanced trees. Communication of the ACM, 33(6):668-676, Jun. 1990.

Qureshi et al., Morphable memory system: a robust architecture for exploiting multi-level phase change memories. In Proceedings of the 37th Annual International Symposium on Computer Architecture (ISCA '07), Jun. 2010.

Recio et al., A remote direct memory access protocol specification. RFC 5040, IBM Corporation, Oct. 2007.

Scales et al., Shasta: A low overhead, software-only approach for supporting fine-grain shared memory. In Proceedings of the Seventh International Conference on Architectural Support for Programming Languages and Operating Systems, ASPLOS VII, Cambridge, Massachusetts, USA, 1996.

Shan et al., Legoos: A disseminated, distributed OS for hardware resource disaggregation. In 13th USENIX Symposium on Operating Systems Design and Implementation (OSDI '18), Carlsbad, CA, Oct. 2018.

Shan et al., Distributed shared persistent memory. In Proceedings of the 8th Annual Symposium on Cloud Computing (SOCC '17), Santa Clara, CA, USA, Sep. 2017.

Zhou et al., Heterogeneous Distributed Shared Memory. IEEE Transactions on Parallel and Distributed Systems, 3(5):540-554, Sep. 1992.

Stuedi et al., Crail: A high-performance i/o architecture for distributed data processing. IEEE Bulletin of the Technical Committee on Data Engineering, 40:40-52. Special Issue on Distributed Data Management with RDMA, Mar. 2017.

Stumm etal., Algorithms Implementing Distributed Shared Memory. IEEE Computer, 23(5):54-64, May 1990.

Suzuki et al., The non-volatile memory technology database (nvmdb). Technical Report CS2015-1011, Department of Computer Science & Engineering, University of California, San Diego, May 2015.

Tang et al., Dma cache: Using on-chip storage to architecturally separate i/o data from cpu data for improving i/o performance. In The Sixteenth International Symposium on High-Performance Computer Architecture (HPCA '10), pp. 1-12, Bangalore, India, Jan. 2010.

Volos et al., Memory-oriented distributed computing at rack scale. Proceedings of the ACM Symposium on Cloud Computing, (SoCC '18), Carlsbad, CA, USA, Oct. 2018.

Wei et al., Deconstructing rdma-enabled distributed transactions: Hybrid is better! 13th USENIX Symposium on Dperating Systems Design and Implementation (OSDI '18), Carlsbad, CA, Oct. 2018.

* cited by examiner

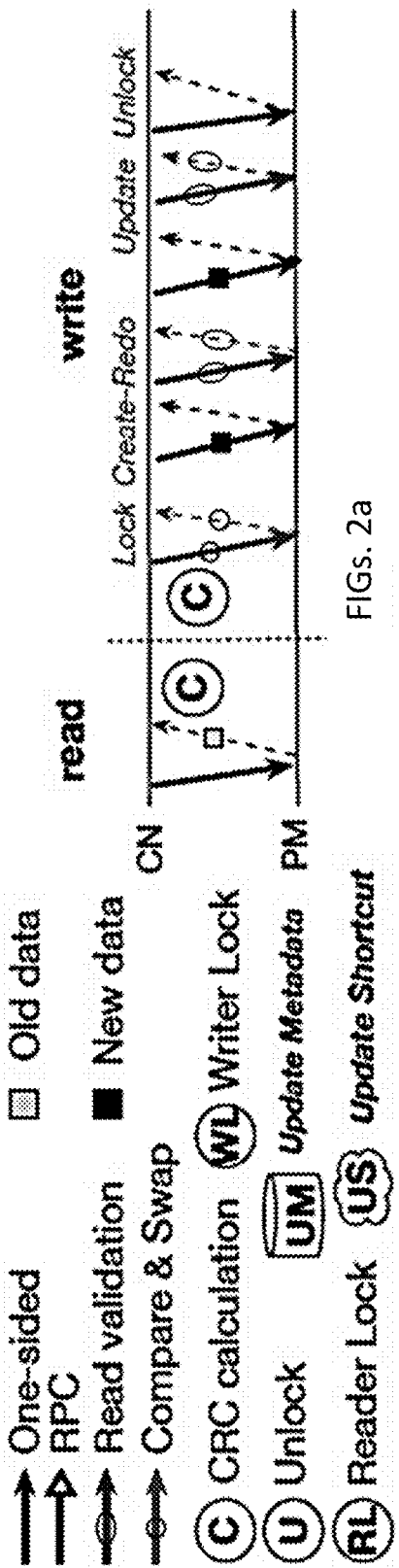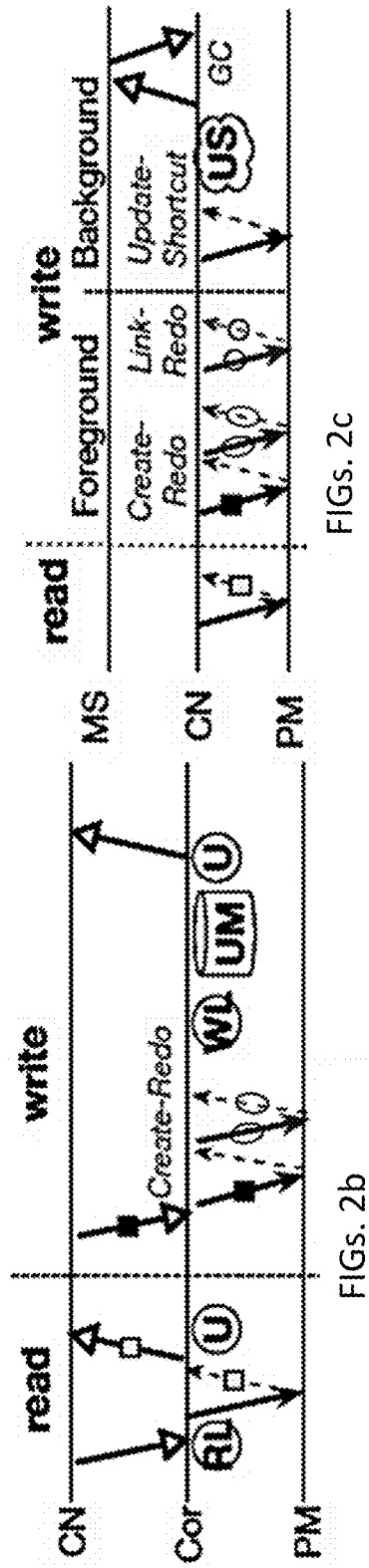
FIGs. 2a
FIGs. 2b
FIGs. 2c

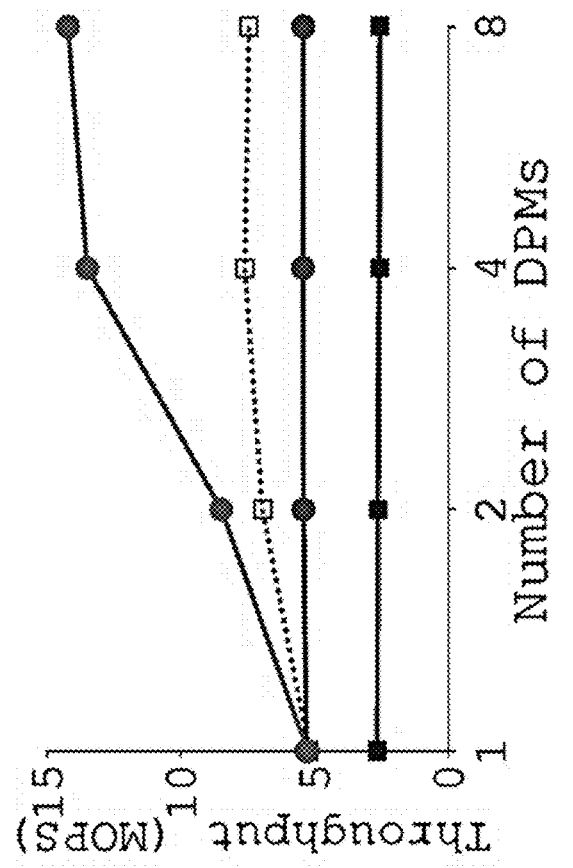
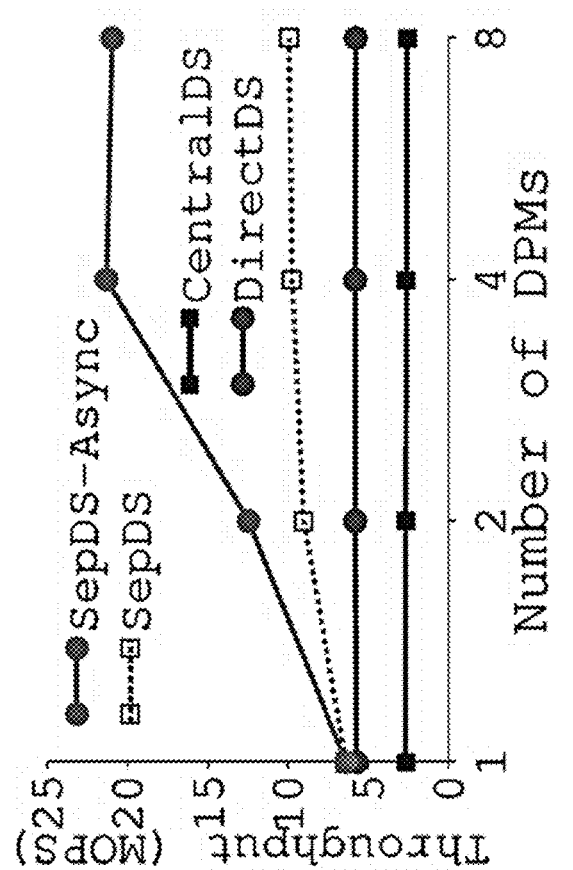
FIGs. 8a
FIGs. 8b

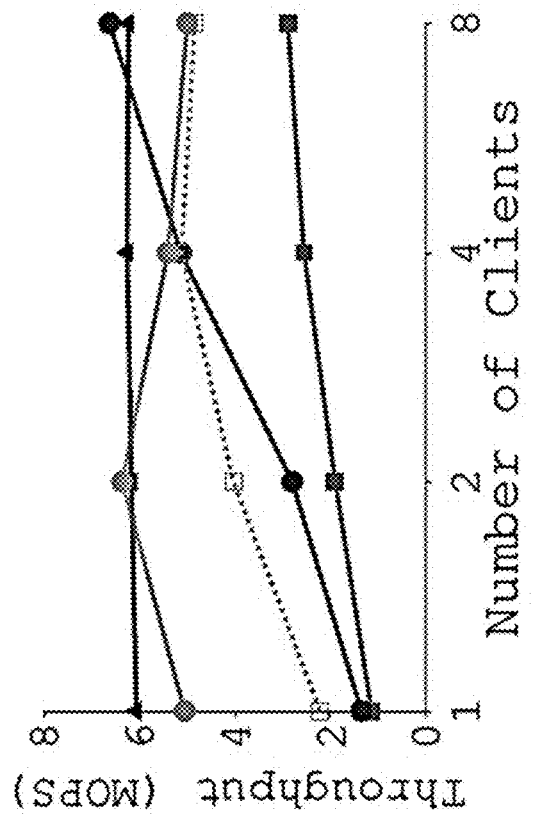
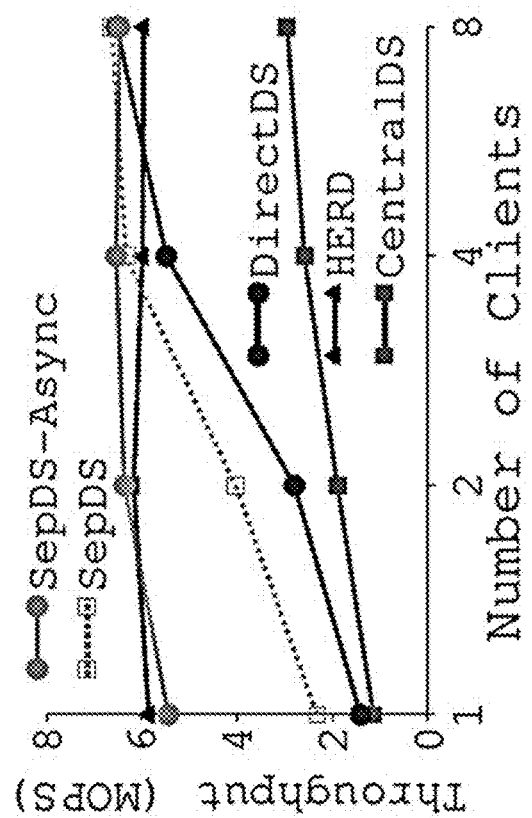
FIGs. 9a
Workload C (0%)
FIGs. 9b
Workload B (5%)

DISTRIBUTED DATA STORE WITH PERSISTENT MEMORY

CROSS-REFERENCE TO RELATED APPLICATIONS

The present patent application is related to and claims the priority benefit of U.S. Provisional Patent Application Ser. No. 62/862,089 filed 16 Jun. 2019, the contents of which are hereby incorporated by reference in its entirety into the present disclosure.

STATEMENT REGARDING GOVERNMENT FUNDING

This invention was made with government support under CNS 1719215 awarded by National Science Foundation. The government has certain rights in the invention.

TECHNICAL FIELD

The present disclosure generally relates to distributed memory networks, and in particular, to a distributed memory network with no processor presence at remote memories.

BACKGROUND

This section introduces aspects that may help facilitate a better understanding of the disclosure. Accordingly, these statements are to be read in this light and are not to be understood as admissions about what is or is not prior art.

With an ever-increasing appetite for data, many companies nowadays are relying on datacenters to hold their data. These datacenters (otherwise referred to as server farms) house large computer servers with a variety of ways to hold and process data, such as in-memory key-value stores, databases, and file systems. In a data storage and processing system in datacenters, the machines offer data service are referred to as storage nodes and the machines that access and process the data are referred to as compute nodes. Compute nodes establish network connections with storage nodes to read/write data from/to them. Traditionally, storage nodes are computer servers that are equipped with CPU, memory, and some storage devices like hard disks or solid state drives (SSDs), and storage nodes run software on their CPUs to provide the data storage service to compute nodes.

Recently, a new hardware technology called persistent memory (PM) or non-volatile main memory (NVMM) was invented. Like hard disks and SSDs, PMs can store data persistently, i.e., data in a PM exist without power, but accessing data in a PM is orders of magnitude faster than accessing data in hard disks and SSDs. PM hardware technology has the potential to largely improve the performance of datacenter data storage systems. Prior solutions have been proposed to install PMs in storage nodes as the replacement of slower storage devices (hard disks or SSDs). These PM-based solutions largely improve the performance of traditional hard-disk-/SSD-based datacenter storage systems. However, the monetary cost of these solutions is still high, including the purchasing cost of storage nodes (computer servers with CPU and PM) and the energy cost of running CPUs in these storage nodes. These storage nodes contribute to the total owning and running cost of datacenters. Unfortunately, there are no current approaches of building data storage systems with PM that avoid the high cost of storage nodes.

There is therefore an unmet need for a new approach to build a less costly and fast PM-based data storage system.

SUMMARY

A method to build a persistent memory (PM)-based data storage system without involving a processor (CPU) at storage nodes is disclosed. The method includes storing data in one or more storage nodes that only include PM and no CPUs, with data stored in PM in form of link lists. The method also includes accessing data stored in the one or more storage nodes' PM directly by remote compute nodes through a network. In addition, the method includes maintaining metadata associated with the data by one or more global controllers (metadata servers). Furthermore, the method includes upon request by a user to read or write data, the compute nodes contacting the one or more metadata servers to obtain location of data of interest to be read from or written to in the one or more storage nodes in form of pointers (shortcuts) to the link-lists that represent the data of interest. The method additionally includes the step of the compute nodes sending network requests directly to the one or more storage nodes' PM to locate latest version of data by tracing the link list from the associated shortcut to corresponding tails.

BRIEF DESCRIPTION OF DRAWINGS

FIG. 2a is a schematic of a read and write protocol of DirectDS associated with the DPM-Direct of FIG. 1c.

FIG. 2b is a schematic of a read and write protocol of CentralDS associated with the DPM-Central of FIG. 1d.

FIG. 2c is a schematic of a read and write protocol of SepDS associated with the DPM-Sep of FIG. 1e.

FIGS. 8a and 8b provide plots of scalability of DPM data stores with respect to the number of DPMs for different workloads.

FIGS. 9a and 9b provide plots of scalability of DPM data stores when varying the number of CNs with a single DPM for different workloads.

DETAILED DESCRIPTION

Figure 1B:
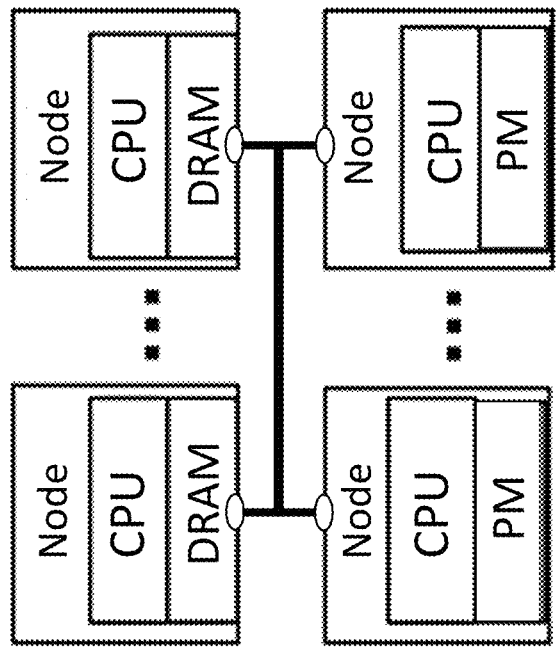
FIGS. 1a and 1b are schematics of traditional memory network implementations.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A new approach to build a less costly and fast remote memory network data storage system is described in the present disclosure which requires no processor at the remote memory locations. Three separate distinct architectures are presented to address this new approach, each being completely self-contained without dependence on the others. In the present disclosure the memory is referred to as dumb persistent memory (DPM). The phrase dumb is applied since the memory requires no local processor intervention. Thus the networks of the present disclosure include memory servers (e.g., server farms), in which each server houses such memory and no processors for control of data to be written to and read from the memory at the servers. The phrase persistent refers to non-volatile, however it is to be appreciated that volatile memory architectures are within the ambit of the present disclosure as well. Non-volatile memory technologies such as 3DXpoint, phase change memory (PCM), spin-transfer torque magnetic memories (STTMs), and memristor provide byte addressability, persistence, and latency that is within an order of magnitude of DRAM, and which are within the scope of the present disclosure as candidate PMs. In addition, PMs consumes significantly lower energy compared to DRAM. PM has attracted extensive research efforts in the past decade, most of which were designed In the distributed networks of the present disclosure, there are compute nodes (CNs) which are remote to memory. The CNs request data read and write and communicate with DPM directly or indirectly. The three architectures of the present disclosure for DPM include 1) DPM-Direct in which CNs directly access and manage DPM; 2) DPM-Central where CNs send both data and control plane operations to a coordinator server, which accesses and manages DPM in a centralized manner; and 3) DPM-Sep in which CNs directly access DPM for data operations and communicate with a global metadata server for the control plane.

Figure 1A:
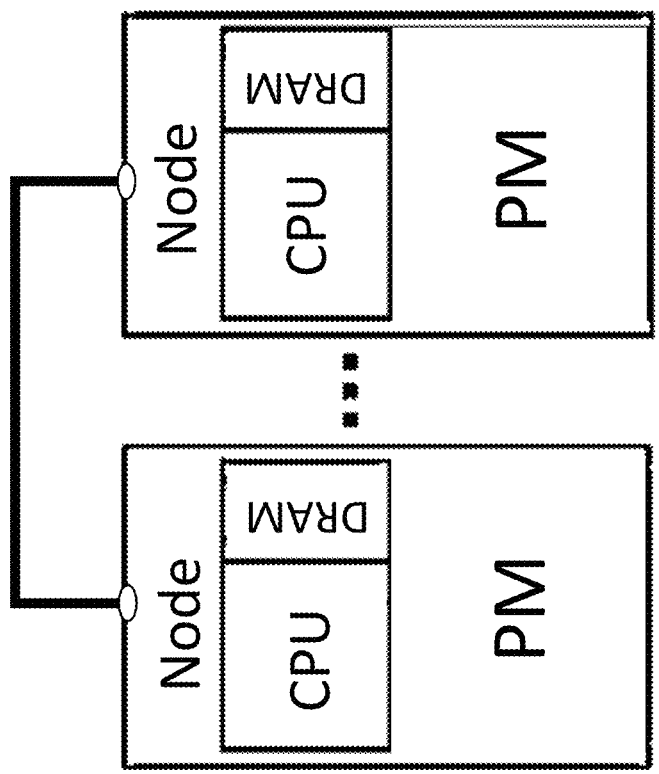

In order to visualize each of the three architectures of the present disclosure, reference is first made to FIGS. 1a and 1b in which schematics of traditional memory network implementations are shown. In FIG. 1a, the schematic of a traditional distributed memory is shown which combines the memory of nodes in a cluster into a virtual memory pool. Processes running on any node in the cluster can allocate and access memory in this global pool. Distributed memory/PM allows a process to use memory larger than local main memory and greatly improves resource utilization. However, it requires significant amount of CPU time on each node to participate in a distributed data access protocol. Referring to FIG. 1b, the schematic of a traditional remote memory model is shown which separates servers in a cluster into two groups, compute nodes and memory nodes. Data is stored and managed at the memory nodes and compute nodes issue network requests to fetch or store data at memory nodes. This model requires CPUs at memory nodes to process memory requests and perform various metadata and control tasks. Therefore, in both these traditional models, a significant amount of processing takes place at the memory nodes.

Figures 1C, 1D:
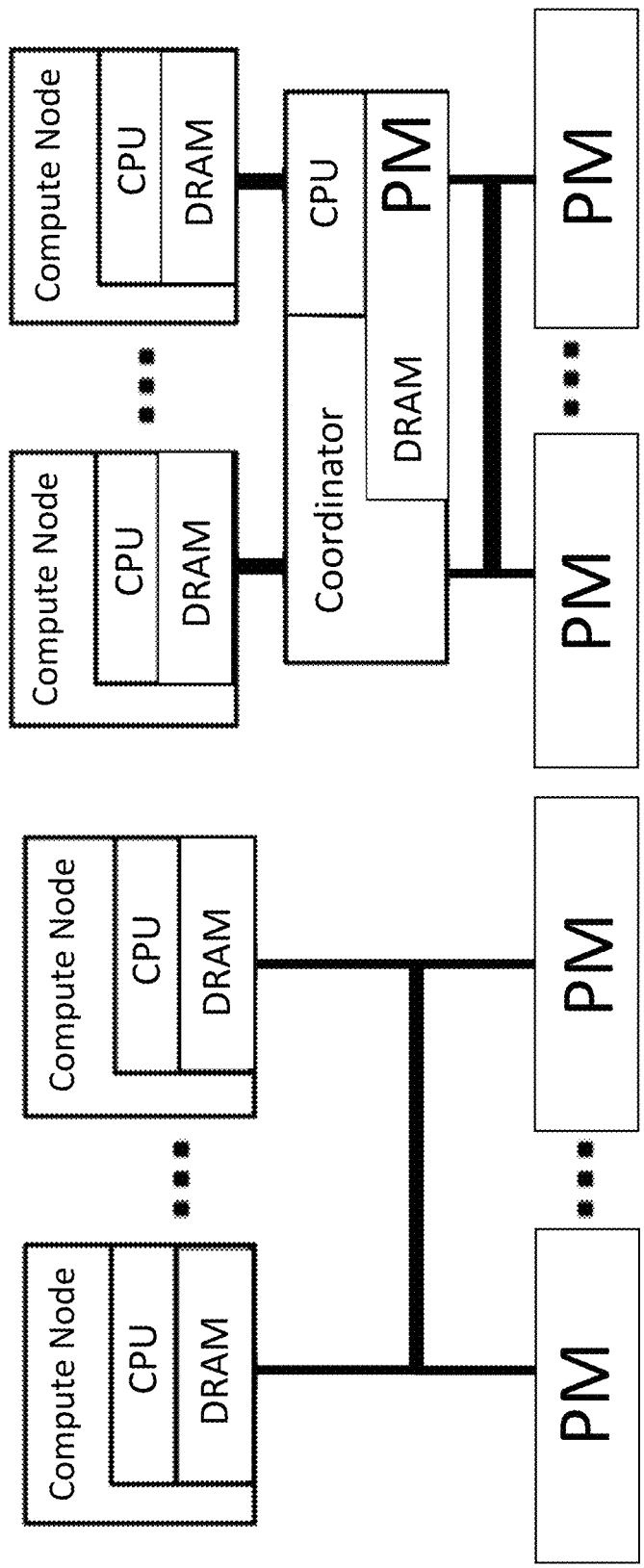
FIG. 1c is a schematic of one of three distinct architectures (DPM-Direct), according to the present disclosure.
FIG. 1d is a schematic of another one of three distinct architectures (DPM-Central), according to the present disclosure
Figure 1E:
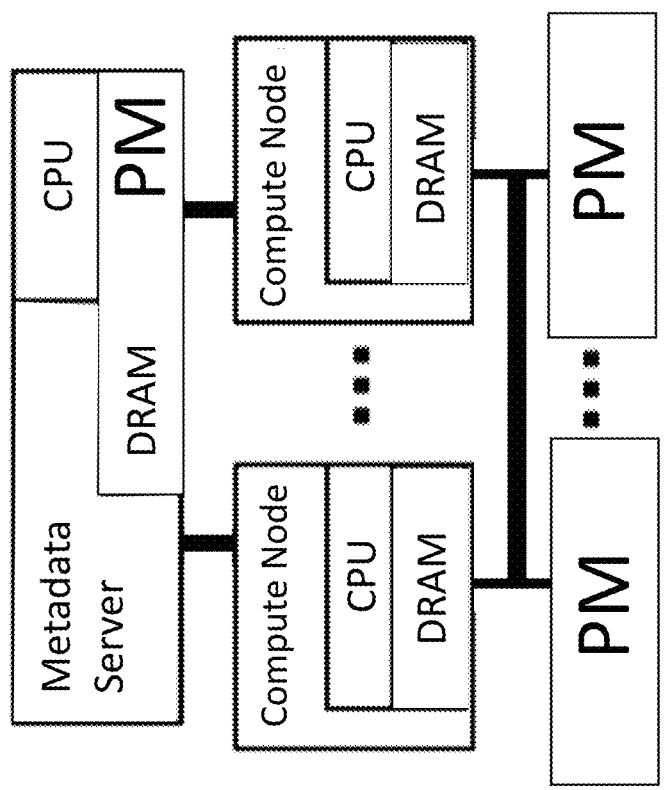
FIG. 1e is a schematic of yet another one of three distinct architectures (DPM-Sep), according to the present disclosure.

In contrast to the traditional approaches, referring to FIGS. 1c, 1d, and 1e, the three distinct architectures (i.e., DPM-Direct (FIG. 1c), DPM-Central (FIG. 1d), and DPM-Sep (FIG. 1e) according to the present disclosure are shown.

One way to deploy PM in datacenters is to insert them to regular servers' DIMM slots. Under this deployment, a low-cost PM-based data stores can be built by treating PM dumb and let remote servers access it through one-sided remote direct memory access (RDMA), as is known to a person having ordinary skill in the art.

Another way to deploy PM is to host them in disaggregated devices. Similar to disaggregated memory and other resource disaggregation systems seen in the prior art, disaggregated PM devices attach directly to the network and can be accessed by remote servers over the network. With the DPM approach, these devices do not need any local processing units; they only need to connect PM directly to a network interface on board (with possibly a small hardware memory controller). A Machine project of prior art also uses the disaggregated approach to organize PM. The Machine organizes a rack by connecting a pool of system on chips (SoCs) to a pool of PMs through a specialized cache-coherent network layer. Although being a significant initial step in disaggregated PM research, the Machine only explores one design choice and relies heavily on special network to access and manage disaggregated PM.

Towards this end (i.e., networked PMs), the three architectures shown in FIGS. 1c-1e are provided by the present disclosure to organize DPM in a way that they work for both server-hosted DPM and disaggregated DPM, over general-purpose RDMA network. The first architecture, DPM-Direct (FIG. 1c), directly connects CNs to DPMs and has CNs perform all data and control plane operations through one-sided RDMA operations to DPMs (FIG. 1c). DPM-Central connects all CNs and DPMs to a central coordinator, which is involved in both data and control planes (FIG. 1d). Finally, DPM-Sep separates data plane and control plane by performing the former directly from CNs to DPMs and the latter handled by one or more global metadata servers (FIG. 1e).

While in each of these three architectures, processing units such as CPU, ASIC, FPGA, and SoC can be removed entirely, reducing not only the cost of these units themselves but also device PCB materials and the developing cost of software running on these units, any DPM implementation is only attractive when there is no or minimal performance lost compared to other more expensive solutions. Building a DPM data store system that can lower the cost but maintain the performance of non-DPM systems is challenging. Different from traditional distributed storage and memory systems, DPMs can only be accessed and managed remotely. A major technical hurdle is in providing good performance with concurrent data accesses. The lack of processing power at DPMs makes it impossible to orchestrate (e.g., serialize) concurrent accesses there. Managing distributed PM resources without any DPM-local processing is also challenging and when performed improperly can be deleterious to foreground performance. In addition, DPMs can fail independently and such failures have to be handled properly to ensure data reliability and high availability.

To confront the aforementioned challenges of DPM, distributed data stores for read-most workloads, the most common access pattern in datacenters is used, according to the present disclosure. Such data stores should still support concurrent writes and ensure data consistency, but their performance should be optimized for reads. Such data stores can be built with no processing units at where data is hosted. By not optimizing for concurrent write performance, low capitalization expense, low operational expense, good performance under low write contention, scalability, manageability, reliability, and high availability are all within reach.

The present disclosure uses a key-value store approach; however, it should be appreciated that other data models can also be used. Users can create, read (get), write (put), and delete a key-value entry. Different CNs can have shared access to the same data. The consistency of concurrent data accesses are managed in software instead of relying on any hardware-provided coherence, although such approaches are also within the ambit of the present disclosure.

The DPM data stores implemented in the present disclosure ensure atomicity of an entry across concurrent readers and writers. A successful write indicates that the data entry is committed (atomically), and reads only see committed value. A single-entry atomic write and read committed is chosen because these consistency and isolation levels are widely used in many data store systems.

Since the DPM systems of the present disclosure store persistent data, it is important to provide data reliability and high availability. The DPM systems of the present disclosure guarantee consistency of data when crashes occur which is an important and critical aspect of PM. After restart, each data entry is guaranteed to either only have new data values or old ones. In addition, in all three architectures shown in FIGS. 1c-1e, replication across DPMs ensure that data is still available even after losing N−1 DPMs (where degree of replication is N).

For data to be persistent in DPM, it is not sufficient to only perform a remote write. After a remote write (e.g., RDMA write), the data can be in NIC, PCIe hub, or PM. Only when the data is written to PM can it sustain power failure. To ensure this data persistence, a remote read is performed to ensure that data is actually in PM. Only the last byte of a data entry is read to verify its persistence.

Referring back to FIG. 1c, the DPM-Direct architecture connects CNs directly to DPMs. CNs perform un-orchestrated, direct accesses to DPMs using RDMA one-sided operations. Under DPM-Direct, performing metadata and control operations from CNs is challenging and costly (e.g., by performing distributed coordination across CNs). There are two planes: control plane and data plane.

With the DPM-Direct architecture, all data and control paths are conducted by CNs in a distributed manner. A data store approach (DirectDS) is chosen for optimized read performance and minimal management/control tasks. To avoid space allocation on each write, DirectDS assigns two spaces for each data entry during creation time, one to write uncommitted new data and one to store committed data. DirectDS uses error detection code to achieve single network round trip (RTT) reads and use a customized distributed locking mechanism for writes.

To implement the DirectDS control place two design choices were made: First, two spaces are pre-assigned for each data entry, one to store committed data where reads go to (this is called the committed space) and one to store in-flight, new data (this is called un-committed space). These spaces are statically allocated at data entry creation time by CNs. Doing so avoids dynamic space allocation and de-allocation. A distributed consensus protocol across CNs is used to perform space allocation and de-allocation and further Memcached is used to store metadata, however, other distributed consensus and metadata management systems can also work. Second, to avoid reading and writing metadata from DPMs and the cost of ensuring metadata consistency under concurrent accesses, CNs in DPM-Direct locally store all the metadata of key-value entries, including the key of a value and the location of its committed and uncommitted spaces.

As far as data plane is concerned, a straightforward method to ensure safe concurrent read and write accesses is to use distributed locks and lock a data entry before accessing it. Doing so causes two network round trips (RTTs) of lock and unlock for each data access. To improve read performance, a lock-free read mechanism is utilized with the help of error detecting codes. Referring to FIG. 2a, a read and write protocol of DirectDS is illustrated. To read a data entry, a CN uses its stored metadata to find the location of the data entry's committed space (and the first 8-byte lock). Then, the CN simply issues an RDMA read to fetch the data and calculates and validates its CRC afterwards. The read latency of DirectDS is one RTT plus the cyclic redundancy check (CRC) calculation time. To write a data entry, a CN first calculates and attaches a CRC to the new data entry. It then locates the entry and locks it. After acquiring the lock, the CN writes the new data (and CRC) to the un-committed space. To ensure data persistence, the CN issues an RDMA read to the last byte of the un-committed space to validate that it is actually written to the PM. This uncommitted data serves as the redo copy that will be used during recovery if a crash happens. The CN then writes the new data to the committed space with an RDMA write and validates it with an RDMA read. At the end, the CN releases the lock. The total write latency is 6 RTTs (when no contention), two of which involve data read/write.

To implement the distributed locking, an RDMA one-sided operations was used. An 8-byte value at the beginning of each data entry is associated to implement its lock. To acquire the lock, a CN performs a one-sided RDMA compare-and-swap (c&s) operation to the value (e.g., comparing whether the value is 0 and if so, setting it to 1). To release the lock, the CN simply performs an RDMA write and sets the value to 0.

The lock implementation of the present disclosure leverages the unique feature of the DPM model that all memory accesses to DPMs come from the network (i.e., the NIC). Without processor's accesses to memory, DMA guarantees that network atomic operations, e.g., the aforementioned c&s, are atomic. Note that an RDMA c&s operation to an in-memory value which can also be accessed locally at the same time does not guarantee the atomicity of the value, and thus it cannot be used in distributed PM systems in the same way.

Consequently, DirectDS delivers very good read performance when read size is small. since it only requires one lock-free RTT and it is fast to calculate small CRC. Its write performance is much worse because of the high RTTs and lock contention on writes to the same data entries. Its scalability is also limited because of lock contention during concurrent writes. Moreover, DirectDS also requires large space for both data and metadata. For each data entry, it doubles the space because of the need to store two copies of data. The metadata overhead is also high, since CNs have to store all metadata.

While DPM-Direct provides a certain level of simplicity and excellent read performance, limitations of DPM-Direct are owed from the fact that there is no central coordination of data, metadata, or control operations. For example, DPM-Direct systems have to write data twice, once to the uncommitted and once to the committed space, because CNs in DPM-Direct only know a fixed location to read committed data. To address these limitation, the DPM-Central architecture (see FIG. 1d) takes a different design and implementation choice and uses a central coordinator to orchestrate all data accesses and to perform metadata and management operations. All CNs send remote procedure call (RPC) requests to the coordinator. An example of the RPC system is the HERD RPC system; however, other RPC systems can also be implemented. The coordinator handles RPC requests by performing one-sided requests to DPMs. For better throughput, multiple RPC handling threads can be used at the coordinator.

Since all requests go through the coordinator, it can serve as the serialization point for concurrent accesses to a data entry. A local read/write lock for each data entry at the coordinator is used as the synchronization of multiple coordinator threads. In addition to orchestrating data accesses, the coordinator performs all space allocation and de-allocation of data entries. The coordinator uses its local PM to persistently store all the metadata for a data entry including its key, its location, and a read/write lock. With the coordinator handling all read requests, it can freely direct a read to the latest location of committed data. Thus, it does not need to maintain the same location for committed data and changes the location of committed data after each write.

To perform a read, a CN sends an RPC read request to the coordinator. The coordinator finds the location of the entry's committed data using its local metadata, acquires its local lock of the entry, reads the data from the DPM using a one-sided RDMA read, releases the lock, and finally replies to the CN's RPC request. The end-to-end read latency a CN observes is 2 RTTs, and both RTTs involve sending data.

When receiving a write request from a CN, the coordinator allocates a new space in a DPM for the new data. It then writes the data and validates it with an RDMA read. Note it is not necessary to lock (either at coordinator or at DPM) during this write, since it is an out-of-place write to a location that is not exposed to any other coordinator RPC handlers.

After successfully verifying the write, the coordinator updates its local metadata of where the committed version of the data entry is and flushes this new metadata to its local PM for crash recovery (by performing CPU cache flushes and memory barrier instructions). Since concurrent coordinator RPC handlers can update the same information of where the latest data entry is, a local lock to protect this metadata change is used. The total write latency without contention is 3 RTTs, with two of them containing data and one for validation. Referring to FIG. 2b, a read and write protocol of CentralDS is illustrated.

CentralDS advantageously reduces write RTTs over DirectDS and thus has good write performance when the scale of the cluster is small. However, the coordinator can become the performance bottleneck when either the number of CNs increases or the number of DPMs increases. CentralDS's read performance is also worse than DirectDS with the extra hop between a CN and the coordinator. In addition, the CPU utilization of the coordinator is high since it needs to have a high amount of RPC handlers to sustain parallel requests from CNs. However, unlike DPM-Direct, CNs in the CentralDS architecture do not need to store any metadata.

As discussed above, DPM-Direct has excellent read performance when data size is small, however, has poor write performance and costly metadata and control plane. CentralDS improves DPM-Direct's write performance and manageability but suffers from the scalability bottleneck of the central coordinator. To solve these problems of the first two DPM architectures, the third architecture, DPM-Sep (see FIG. 1e), and a data store designed for it, thereby constituting SepDS. The main idea of DPM-Sep is to separate the data plane from the control plane. It lets CNs directly access DPMs for all data operations and uses a metadata server (MS) for all control plane operations.

The MS stores metadata of all data entries in its local PM. By keeping the amount of metadata small, and 1 TB of PM (a conservative estimation of the size of PM a server can host) metadata for 64 TB data can be stored at the granularity of 1 KB per data entry. CNs cache metadata of hot data entries; under memory pressure, CNs will evict metadata according to an eviction policy (e.g., first in first out (FIFO) and least recently used (LRU)).

SepDS aims to deliver scalable, low-latency, high-throughput performance under low write contention at the data plane and to avoid the MS being the bottleneck at the control plane. The overall approaches to achieve these design goals include: 1) moving all metadata operations off performance critical path, 2) using lock-free data structures to increase scalability, 3) employing optimization mechanisms to reduce network round trips for data accesses, and 4) leveraging the unique atomic data access guarantees of DPM. Referring to FIG. 2c, a read and write protocol of SepDS is illustrated.

Figure 3:
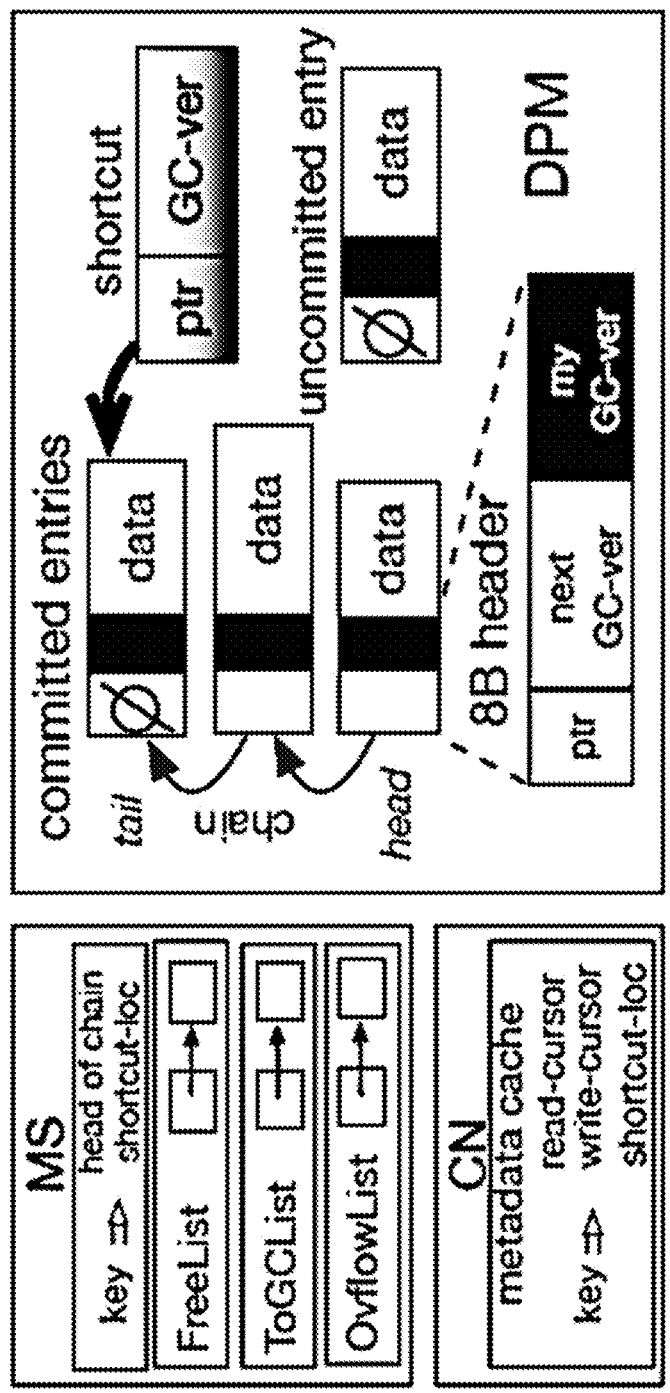
FIG. 3 is a schematic of the data structures used in SepDS associated with the DPM-Sep of FIG. 1e.

Referring to FIG. 3, a schematic of the data structures used in SepDS is shown. To achieve the data plane design goal, a novel mechanism to perform lock-free, fast, and scalable reads and writes is implemented. The basic idea is to allow multiple committed versions of a data entry in DPMs and to link them into a chain. Each committed write to a data entry will move its latest version to a new location. To avoid the need to update CNs with the new location, a self-identifying data structure is used to let CNs be able to find the latest version.

A header is included with each version of a data entry, which contains a pointer and some metadata bits used for garbage collection. The pointers chain all versions of a data entry together in the order that they are written. A NULL pointer indicates that the version is the latest.

A CN acquires the header of the chain head from the MS at the first access to a data entry. It then caches the header locally to avoid the overhead of contacting MS on every data access. As a CN reads or writes an entry, it advances its cached header. A CN-cached header is referred to herein as a cursor.

SepDS reads are lock-free. To read a data entry, the CN performs a chain walk. The chain walk begins with fetching the data entry to which its current cursor points. It then follows the pointer in the following entries until it reaches the last entry. All steps in the chain walk use one-sided RDMA reads. After a chain walk, the CN updates its cursor to the last entry.

A chain walk can be slow with long chains when a cursor is not up to date. To solve this challenge a skip-list approach can be used by generating a shortcut to directly point to a newer entry. The shortcut of a data entry is stored in DPM and the location of the shortcut never changes during the lifetime of the data. MS stores the locations of all shortcuts and CNs cache the hot ones. Shortcuts are best effort in that they are intended but not enforced to always point to the last version of an entry.

The CN issues a chain walk read and a shortcut read in parallel. It returns to user when the faster one returns and discards the other result. Note that chain walks are not completely replaced with shortcut reads, since shortcuts are updated asynchronously in the background and may not be updated as fast as the cursor. When the CN has a pointer that points to the latest version of data, a read only takes 1 RTT.

SepDS never overwrites existing data entries and performs a lock-free out-of-place write before linking the new data to an entry chain. To write a data entry, a CN first selects a free DPM buffer assigned to it by MS in advance. It performs a one-sided RDMA write to write the new data to this buffer and then issues a read of the last byte to ensure that the data is written in PM. Afterwards, the CN performs an RDMA c&s operation to link this new entry to the tail of the entry chain. Specifically, the c&s operation is on the header that CN's cursor points to. It compares if the pointer in the header is NULL and swaps the pointer to point to the new entry. If the c&s succeeds, the data is treated as committed and return the write request to the user. If the pointer is not NULL, it means that the cursor does not point to the tail of the chain and a chain walk is performed to reach the tail and then do another c&s.

Afterwards, the CN uses a one-sided RDMA write to update the shortcut of the entry to point to the new data entry. This step is off the performance critical path. The CN also updates its cursor to the newly written data entry. At this time other CNs' cursors are not invalidated or updated to improve the scalability and performance of SepDS.

SepDS' chained structure and write mechanism ensure that writers do not block readers and readers do not block writers. They also ensure that readers can only view committed data. Without high write contention to the same data entry, one write takes only 3 RTTs.

After committing a write, a CN can retire the old data entry, indicating that the entry space can be reclaimed. To improve performance and minimize the need to communicate with the MS, CNs perform lazy, asynchronous, batched retirement of old data entries in the background. Thus further need for MS to invalidate CN-cached metadata using a combination of timeout and epoch-based garbage collection is avoided.

CNs communicate with the MS using two-sided operations for all metadata operations. The MS performs all types of management of DPMs. It manages physical memory space of DPM, stores the location and shortcut of a data entry.

With the data plane out-of-place write model, SepDS has high demand for DPM space allocation. An efficient space allocation mechanism is used where MS packages free space of all DPMs into chunks. Each chunk hosts the same size of data entries and different chunks can have different data sizes, similar to FaRM and Hoard, known to a person having ordinary skill in the art. Instead of asking for a new free entry before every write, each CN requests multiple entries at a time from the MS in the background. This approach moves space allocation off the critical path of writes and is important to deliver good write performance.

SepDS' append-only chained data structure makes its writes very fast. But like all other append-only or log-structured data stores, SepDS needs to garbage collect (GC) old data. A new efficient GC mechanism is thus presented that does not involve any data movement or communication to DPM and minimizes the communication between MS and CNs.

The basic flow of GC is simple: the MS keeps busy checking and processing incoming retire requests from CNs. The MS decides when a data entry can be reclaimed and puts a reclaimed entry to a free list (FreeList). It gets free entries from this list when CNs request for more free buffers. A reclaimed entry can be used by any CN for any new entry, as long as the size fits.

Although the above strawman GC implementation is simple, making GC work correctly, efficiently, and scale well is challenging. First, to achieve good GC performance, invalidations of CN cached cursors is avoided after reclaiming entries so as to minimize the network traffic between the MS and CNs. However, with the strawman GC implementation, CNs' outdated cursors can cause failed chain walks. This problem can be solved by using two techniques: 1), the MS does not clear the header (or the content) of a data entry after reclaiming it, and 2), assign a GC version to each data entry. The MS increases the GC version number after reclaiming a data entry. It gives this new GC version together with the location of the entry when assigning the entry as a new free buffer to a CN, A. Before CN A uses the entry for its new write, the entry content at the DPM still has old header and data (with old GC version). Other CNs that have cached cursors to this entry can thus still use the old pointer to perform chain walk. CNs differentiate if an entry is its intended data or has already been reclaimed and reused for other data by comparing the GC version in its cached cursor and the one it reads from the DPM. After CN A writes the new data with the new GC version number, other CNs that have the old cursors will have a mismatched GC version and discard the entry and invalidates their cursors. Doing so not only avoids the need for MS to invalidate cursor caches on CNs, but also eliminates the need for MS to access DPMs during GC.

The next challenge is related to the targeted guarantee of read isolation and atomicity (i.e., readers should always read the data that is consistent to its metadata header). An inconsistent read can happen if the read to a data entry takes long and during the reading time, this entry has been reclaimed and used to write a new data entry. A read timeout scheme can be used. CNs abort a read operation after Tr, an agreed value among CNs and the MS. The MS delays the actual reclamation of an entry to only Tr time after it receives the retire request of the entry. Specifically, the MS leaves the entry in a ToGCList for Tr and then moves it to the FreeList.

The final challenge is the overflow of GC version numbers. Only limited number of bits can be used for GC version in the header of a data entry (currently 8 bits), since the header needs to be smaller than the size of an atomic RDMA operation. When the GC version of an entry increases beyond the maximum value, it will have to restart from zero. With just the GC version number and the GC mechanism so far, CNs will have no way to tell if an entry matches its cached cursor version or has advanced by 28=256 versions. To solve this rare issue without invalidation traffic to CNs, an epoch-based timeout mechanism can be used. When the MS finds the GC version number of a data entry overflows, it puts the reclaimed entry into OvflowList and waits for Te time before moving it to the FreeList that can be assigned to CNs. All CNs invalidate their own cursors after an inactive period of Te (if during this time, the CN access the entity, it would have advanced the cursor already). To synchronize epoch time, the MS sends a message to CNs after Te, and the MS can choose the value of Te. Epoch message is the only communication the MS issues to CNs during GC.

The SepDS design offers four benefits. First, SepDS reads and writes are fast, with 1 RTT and 3 RTTs respectively when there is no contention. Even under contention, SepDS still achieves comparable performance as alternative systems.

Achieving this low latency and guaranteeing atomic write and read committed is not easy and is achieved by the combination of four approaches: 1) ensuring the data path does not involve the MS, 2) reducing metadata communication to the MS and moving it off performance critical path, 3) ensuring no memory copy in the whole data path, and 4) leveraging the unique advantages of DPM to perform RDMA atomic operations.

Second, SepDS scales well with the number of CNs and DPMs, since its reads and writes are both lock free. Readers do not block writers or other readers and writers do not block readers. Concurrent writers to the same entity only contend for the short period of RDMA c&s operation. SepDS also minimizes the network traffic to MS and the processing load on MS to make MS scale well with number of CNs and data operations.

Third, all data movement or communication between the MS and DPMs during GC can be avoided. To scale and support many CNs with few MSs, CN invalidation messages can be avoided completely. The MS does not need to proactively send any other messages to CNs either. Essentially, the MS never pushes any messages to CNs. Rather, CNs pull information from the MS.

Finally, the SepDS data structure is flexible and can support load balancing very well. Different entries of a data entity do not need to be on the same DPM device.

DPMs can fail independently from CNs. A DPM system needs to handle both the transient failure of a DPM (which can be rebooted) and a permanent failure of one. For the former, the three DPM systems guarantee crash consistency, i.e., after reboot, the DPM can recover all its committed data. For the latter, the support for data replication across multiple DPMs is added to all the three data store systems. In addition, CentralDS and SepDS also need to handle the failure of the coordinator and the MS.

Since the PM are specifically intended to be resilient to transient failures, recovery from such failures is now discussed for each of the three architectures.

When recovering a DPM in DirectDS, a decision needs to be made whether to use the data in the committed space or the un-committed space (i.e., where the redo copy is). DirectDS validate the data in the committed space with its CRC. During recovery, the CRC of the committed space is calculated. If the CRC is correct, it indicates the committed space has the complete data. Otherwise, the data from the redo copy to the committed space is copied.

Handling the failure of a DPM in CentralDS is simple, as long as the coordinator stays alive. Since CentralDS performs out-of-place writes and the coordinator stores the state of all writes, the information in the coordinator to know what writes have written their redo copies are used but which have not committed yet and what writes have not written redo copies. For the former case, the redo copy is advanced, and for the latter, thus the original version is used.

SepDS' recovery mechanism is also simple. If a DPM fails before a CN successfully links the new data it writes to the chain (indicating an un-committed write), the CN simply unsets lock bits (within a pointer) of the data entry (releasing the held lock) and discards the new write (by treating the space as unused).

To add robustness to each architecture, redundancy is added and the impact on coordinator and MS failures. With the user-specified degree of replication being N, the data store systems guarantee that data is still accessible after N−1 DPMs have failed.

In order to sustain DPM failure during a write, both the first write to the un-committed space (the redo copy) and the second write to the committed space need to be replicated. After getting the lock, a CN sends the new data to the un-committed space on N DPMs in parallel. Afterwards, it performs N read validation, also in parallel. Once read validation of all the copies succeeds, the CN writes the data to the committed space of the N DPMs in parallel and performs a parallel read validation afterwards.

To handle a replicated write RPC request, the coordinator writes multiple copies of the data to N DPMs in parallel and performs a parallel read validation of them. After the read validation, the coordinator updates its metadata to record the new locations of all these copies.

Figure 4:
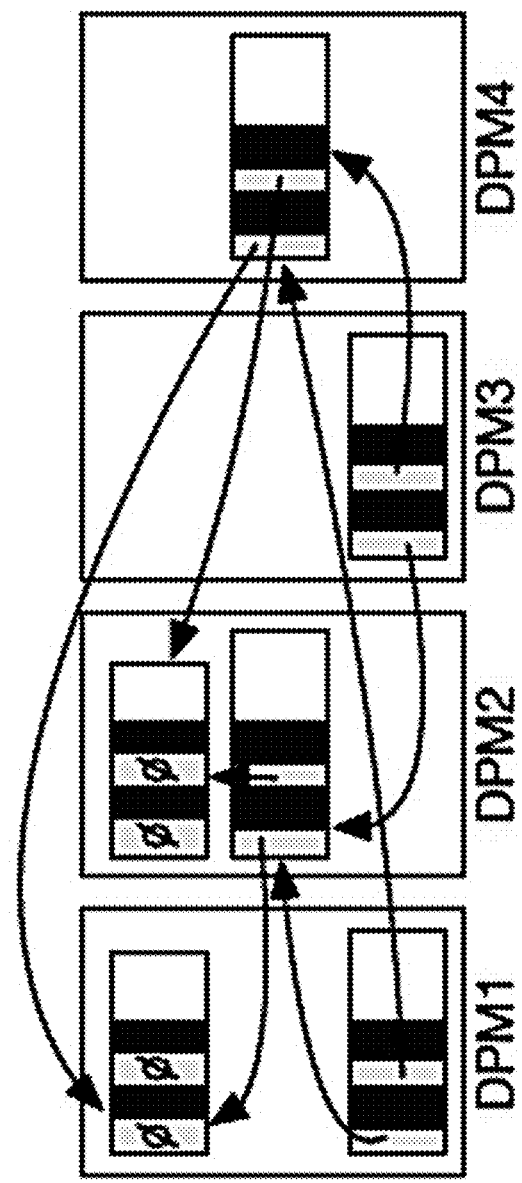
FIG. 4 is a schematic of an example of data entry replication used in SepDS associated with the DPM-Sep of FIG. 1e.

A new atomic replication mechanism designed for the SepDS data structure is disclosed herein. The basic idea is to link each data entry version $D_N$ to all the replicas of the next version (e.g., $D^a_{N+1}$, $D^b_{N+1}$, $D^c_{N+1}$ for three replicas) by placing pointers to all these replicas I the header of $D_N$. Referring to FIG. 4, an example of replicated data entry is shown. With this all-way chaining, SepDS can always construct a valid chain as long as one copy of each version in an entry survives.

Each data entry has a primary copy and one or more secondary copies. To write a data entry $D_{N+1}$ with R replicas to an entry whose current tail is $D_N$, a CN first writes all copies of $D_{N+1}$ to R DPMs. In parallel, a CN performs a one-sided c&s to a bit, $B_w$, in the header of the primary copy of $D_N$ to test if the entry is already in the middle of a replicated write. If not, the bit will be set, indicating that the entry is now under replicated write. All the writes and the c&s operation are sent out together to minimize latency.

After the CN receives the hardware acknowledgment of all the operations, it constructs a header that contains R pointers to the copies of $D_{N+1}$ and writes it to all the copies of $D_N$. Once the new header is written to all copies of $D_N$, the system can recover $D_{N+1}$ from crashes (up to R−1 concurrent DPM failure).

To avoid the coordinator or the MS being the single point of failure in CentralDS and SepDS, a mechanism to enabling one or more backup coordinator (MS) is implemented, by having the primary coordinator (MS) replicate the metadata that cannot be reconstructed (i.e., keys and locations of values) to the backup coordinator (MS) when changing these metadata.

With the DPM model, a system will have a pool of DPMs. Thus, it is beneficial to balance the load to each of them. With a centralized place to initiate all requests, it is easy for CentralDS to perform load balancing. The coordinator simply records the load to each DPM and directs new writes to the DPM with lighter load. When DPM is replicated, the coordinator can also balance read loads by selecting the replica that is on the DPM with lighter load.

A novel two-level approach is used to balance loads in SepDS: globally at MS and locally at each CN. The global management leverages two features in SepDS: 1) MS assigns all new space to CNs; and 2) data entries of the same entity in SepDS can be on different DPMs. To reduce the load on a DPM, MS directs all new writes to other devices. At a local level, each CN internally balances the load to different DPMs. Each CN keeps one bucket per DPM to store free entries. It chooses buckets from different buckets for new writes according to its own load balancing needs. However, balancing loads with the DPM-Direct architecture is challenging since there is no coordination across CNs.

An actual reduction to practice for each of the three architectures shown in FIGS. 1c-1e was constructed, the result of each of which is presented below. All the experiments were carried out in a cluster of 14 machines, connected with a 100 Gbps Mellanox InfiniBand Switch. Each machine is equipped with two Intel Xeon E5-2620 2.40 GHz CPUs, 128 GB DRAM, and one 100 Gbps Mellanox ConnectX-4 NIC.

Figure 5:
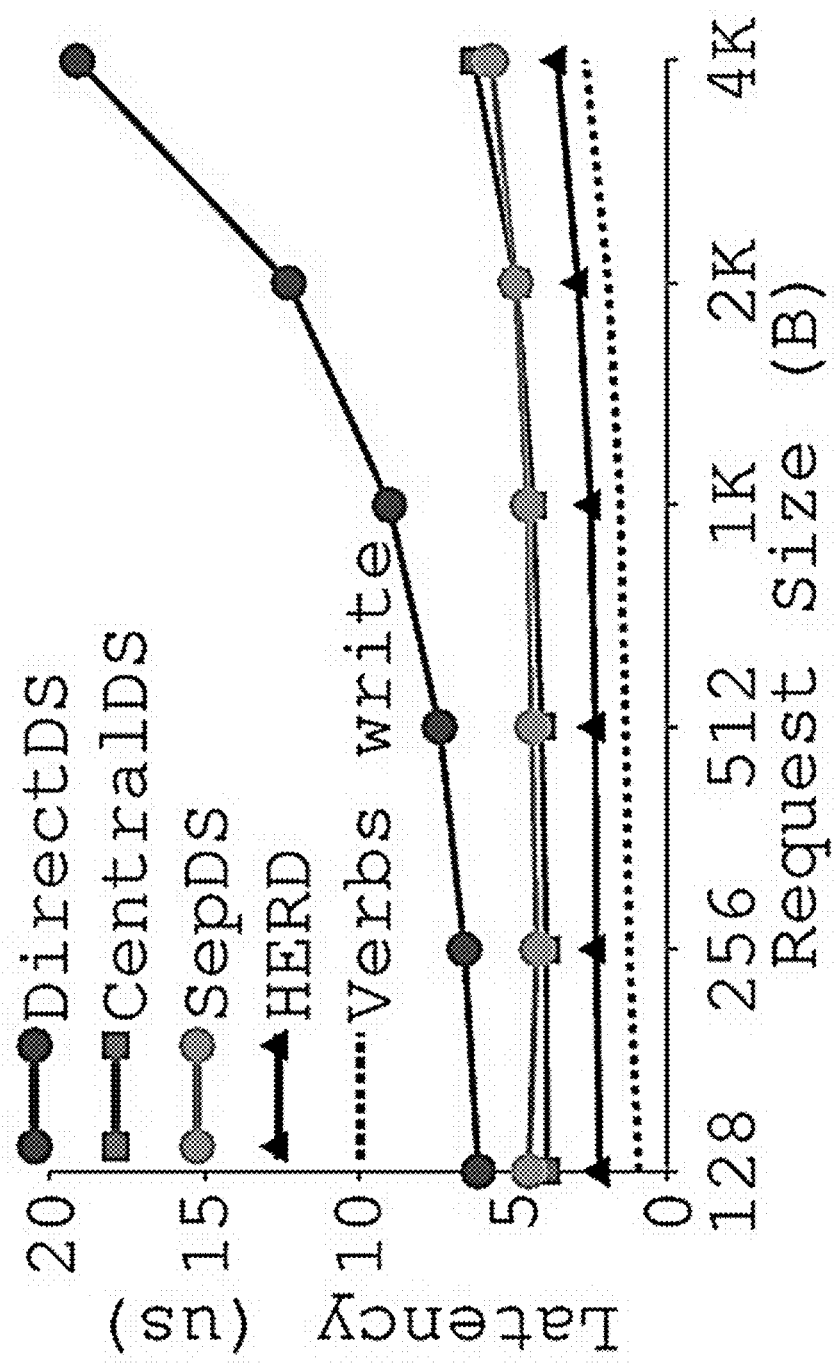
FIG. 5 provides plots of the average write latency with different request sizes for a dumb persistent memory (DPM) data stores' write performance.

To begin the evaluation of performance of each architecture, first DPM data stores' read and write performance are evaluated using a simple micro-benchmark. Referring to FIG. 5, plots of the average write latency with different request size are presented. Native RDMA one-sided write as the baseline is used; it only performs a write without any read validation and has the lowest latency. Among DPM systems, SepDS and CentralDS achieve the best write latency. DirectDS's write performance is the worst because of its 6-RTT write protocol. Its write performance also gets worse with larger request size because of the increased overhead of CRC calculation.

DPM systems are compared with HERD, a two-sided RDMA-based in-memory key-value store. HERD's default configuration of using 12 busy polling receiving side's threads for all the experiments are utilized. HERD outperforms the DPM systems on write latency because it only does a write without read validation. Finally, all the DPM systems' write performance without read validation (i.e., treating DPM as volatile memory) are evaluated. Each read validation cost a constant of 1.5 μs overhead.

Read validation is just one way that works with current RDMA and PM hardware to ensure an PM write is persistent. When PM is deployed in practice with RDMA, the supporting hardware will have another way of guarantee write persistence without the need of the extra RTT of read validation (e.g., by simply changing the NIC to only send the ACK after data is written to the PM media). Because of this and to have a fair comparison with DRAM-based systems like HERD, the read validation step is not performed in the rest of the evaluation.

Figure 6:
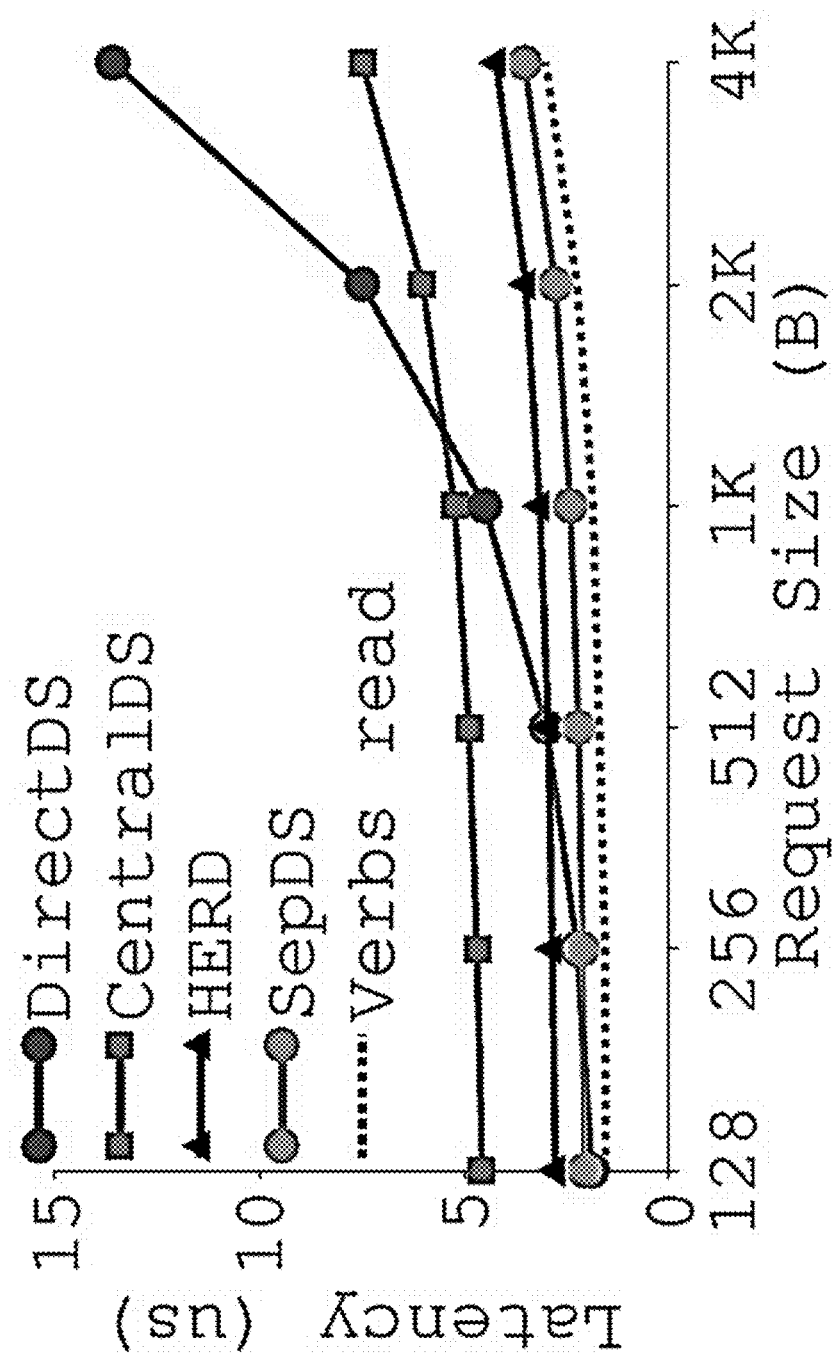
FIG. 6 provides plots of the average read latency with different request sizes for the same DPM as in FIG. 5.

Referring to FIG. 6, plots of the read latency comparison are provided. Native one-sided RDMA read is again used as a baseline here. Overall, SepDS's performance is the best among DPM systems and is only slightly worse than native RDMA. DirectDS has very good read performance when request size is small. However, when request size increases, the overhead of CRC calculation dominates, largely hurting DirectDS's read performance. As expected, CentralDS's read performance is not good because of its 2-RTT read protocol. HERD performs worse than SepDS because of it requires some extra CPU processing time for each read.

Figure 7:
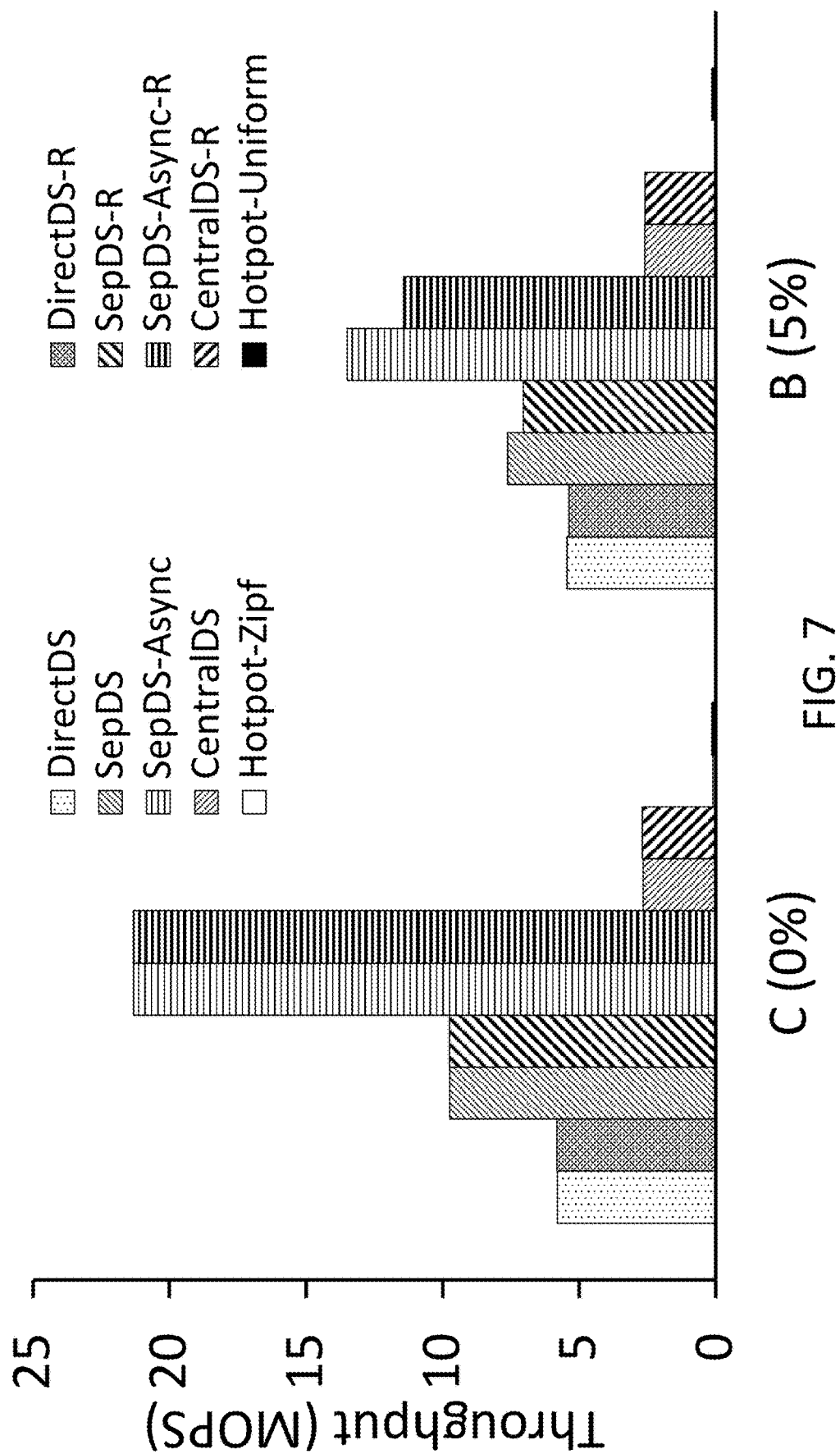
FIG. 7 provides bar graphs to show the overall performance of DPM systems, replicated DPM systems (with degree of replication 2), and a reference (Hotpot).

All the aforementioned DPM architectures (see FIGS. 1c-1e) were evaluated under one configuration: 4 CNs and 4 DPMs, each CN running 8 application threads. Referring to FIG. 7, bar graphs are provided to show the overall performance of DPM systems, replicated DPM systems (with degree of replication 2), and Hotpot.

SepDS performs the best among all systems regardless of read/write intensity, even under high contention (with Zipf distribution to keys). SepDS-async further improves SepDS's throughput by sending more requests at the same time. DirectDS performs well with workloads that are read intensive. DirectDS's read performance is not affected by contention, since it does not need to perform any lock. CentralDS's read performance is worse than DirectDS and SepDS because each read in CentralDS requires 2 RTTs and under contention the coordinator becomes the bottleneck.

The overall performance of Hotpot is orders of magnitude worse than all DPM data stores. The main reason is that each read and write in Hotpot involves a complex protocol that requires RPCs across multiple nodes. Hotpot's performance is especially poor with writes, since the distributed PM consistency protocol involves frequent invalidation of cached copies, especially under high write contention to the same data. Hotpot performs better when running workloads with uniform distribution (but still much worse than DPM systems). The Hotpot results are from its MRSW consistency level without replication and four servers in total, each running 8 application threads. Hotpot only supports the 40 Gbps ConnectX-3 NIC, so its performance can also be partially impacted by the NIC compared to the ConnectX-4 environment.

As expected, adding redundancy lowers the throughput of write operations in all data stores. Even though all systems issue the replication requests in parallel, they only use one thread to perform asynchronous RDMA read/write operations and doing so still has an overhead.

Next, the scalability of different DPM systems with respect to the number of CNs and the number of DPMs are evaluated. Referring to FIGS. 8a and 8b, plots of scalability of DPM data stores with respect to the number of DPMs (HERD only supports single memory node and are thus not included in this experiment) are shown for different workloads. SepDS scales well with DPMs because CNs access DPMs directly for data accesses, having no scalability bottleneck. SepDS-async improves SepDS further by sending more asynchronous requests (it saturates the network full bandwidth beyond four DPM nodes. CentralDS has poor scalability because of the coordinator being the bottleneck that all requests have to go through. Surprisingly, DirectDS's scalability is also poor. Although CNs in DirectDS access DPMs directly, they need to calculate CRC for each read/write request. When the number of DPM nodes increases, CNs need to do more CRC calculation in the same amount of time and this computation overhead becomes a performance bottleneck.

Referring to FIGS. 9a and 9b, plots of scalability of DPM data stores and HERD when varying the number of CNs with a single DPM are shown for different workloads. SepDS-async and HERD have the best (and similar) performance with workload C, effectively saturating the network full bandwidth. Both systems send asynchronous requests that can saturate network bandwidth and neither systems have any scalability bottlenecks. Under workload B, the performance of SepDS is slightly worse with more CNs because of the increased write contention. The rest three systems cannot saturate network bandwidth but scale well with more CNs.

Figure 10:
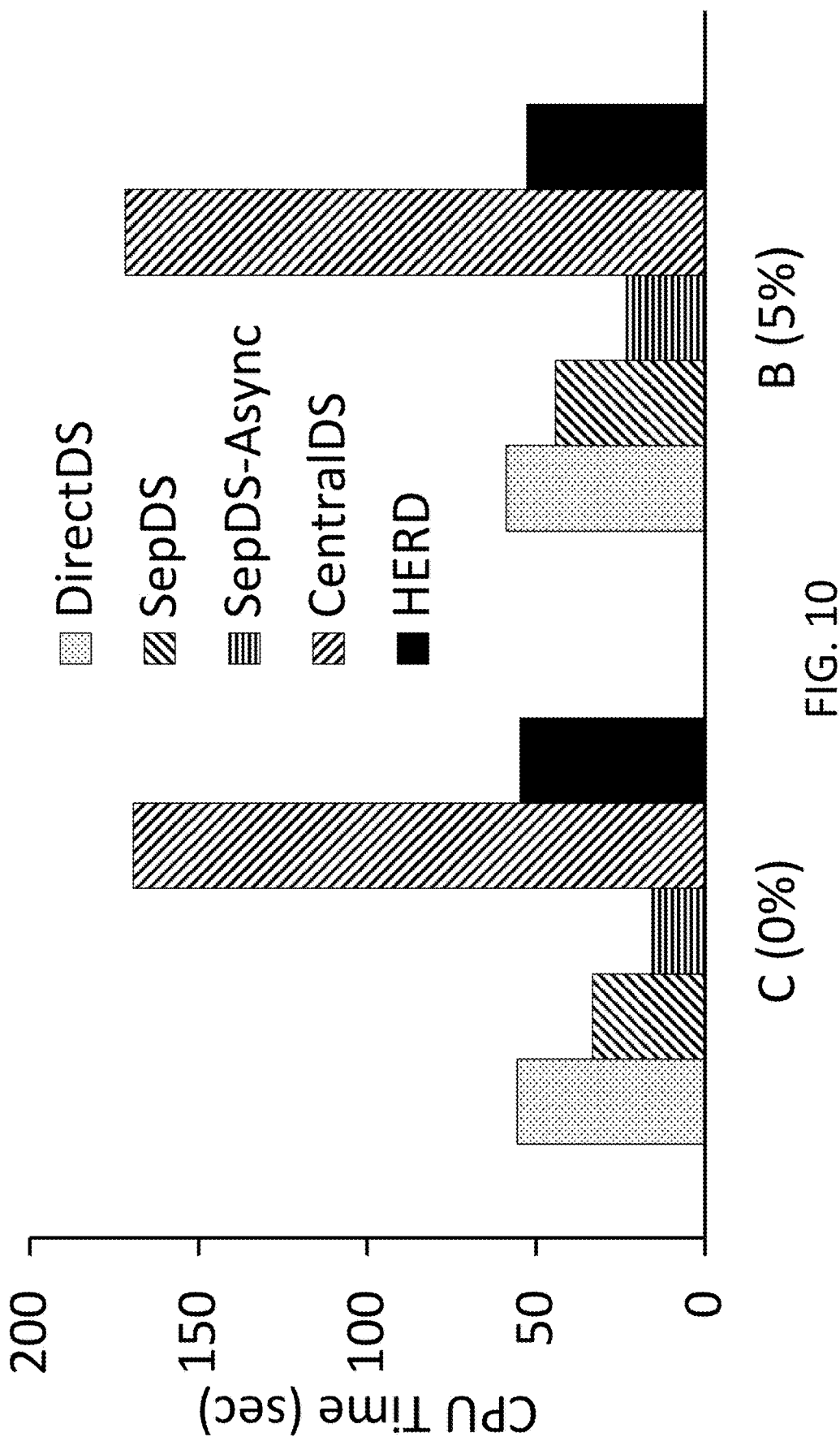
FIG. 10 provides plots of total CPU time to complete ten million requests shown as part of experiments to understand performance impact on CPUs.

To understand the CPU utilization of different data stores, experiments were performed whose results are shown in FIG. 10 which shows plots of the total CPU time to complete ten million requests. For read-intensive workload, DirectDS and SepDS use less CPU time than CentralDS and HERD because they perform one-sided RDMA directly from CNs to DPMs. SepDS-async reduces CPU time further because of its higher throughput performance. HERD also uses asynchronous requests but takes 2.3 longer total CPU time, because it uses many busy-polling threads at its memory nodes to achieve good performance (12 threads by default). Note that HERD only supports one memory node, and a perfect scaling of HERD is assumed to estimate its upper bound of performance (lower bound of CPU time). CentralDS has high CPU utilization because the coordinator's CPU spends time on every request and the total time to finish the workloads with CentralDS is long.

Figure 11:
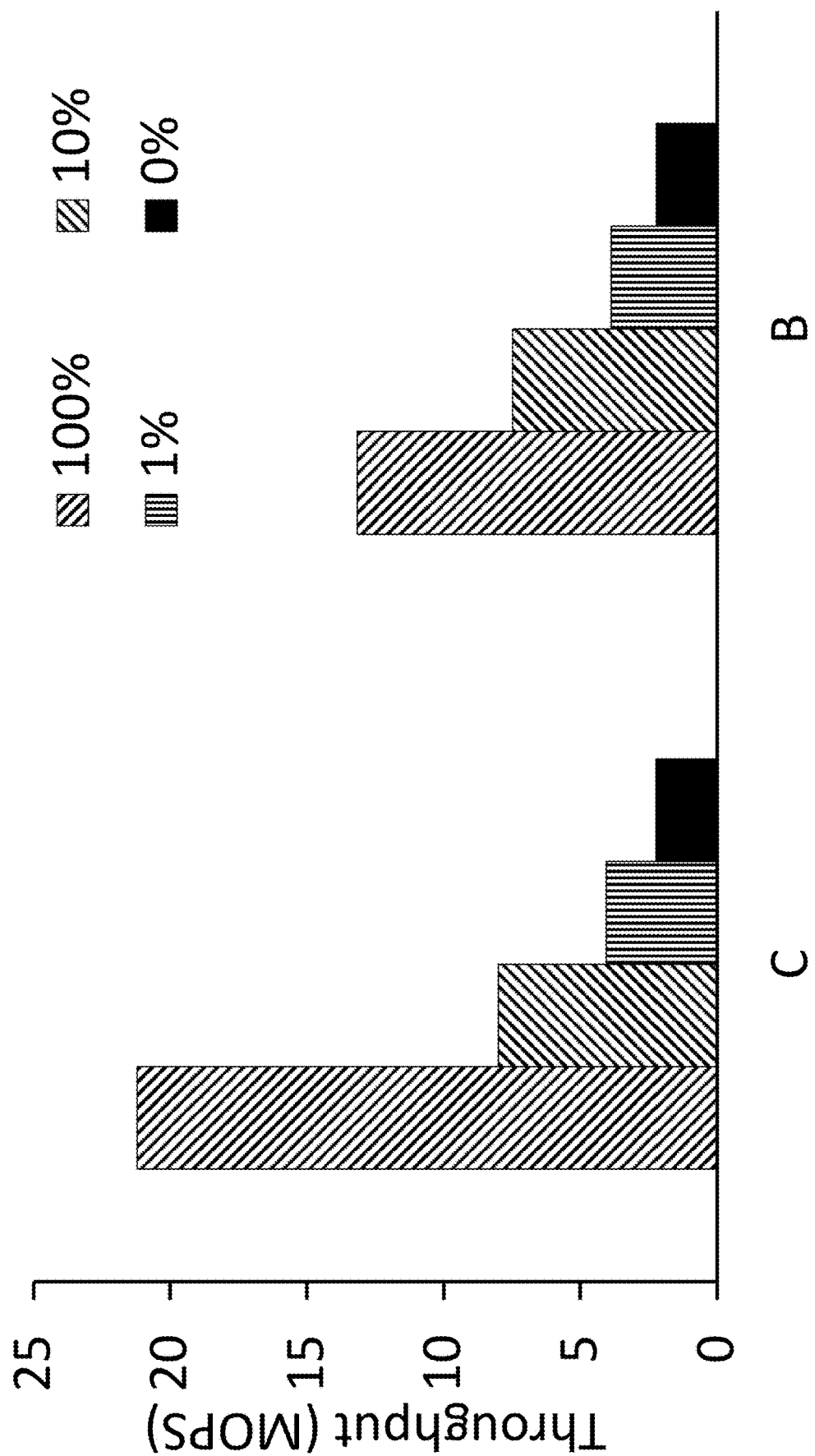
FIG. 11 provides bar graphs of effect of metadata cache in SepDS associated with the DPM-Sep of FIG. 1e.

To evaluate the effect of different sizes of metadata cache at CNs in SepDS, same YCSB workloads and configuration were used as FIG. 7 and plot the results in FIG. 11, which provides bar graphs of effect of metadata cache in SepDS. Here, the FIFO eviction policy is used (the LRU was also tested and found it to similar or worse than FIFO). With smaller metadata cache, all workloads' performance drop because a CN has to get the metadata from the MS before accessing the data entry that does not have local metadata cache. With no metadata cache (0%), CNs need to get metadata from the MS before every request. However, under Zipf distribution, with just 10% metadata cache, SepDS can already achieve satisfying performance.

Figure 12:
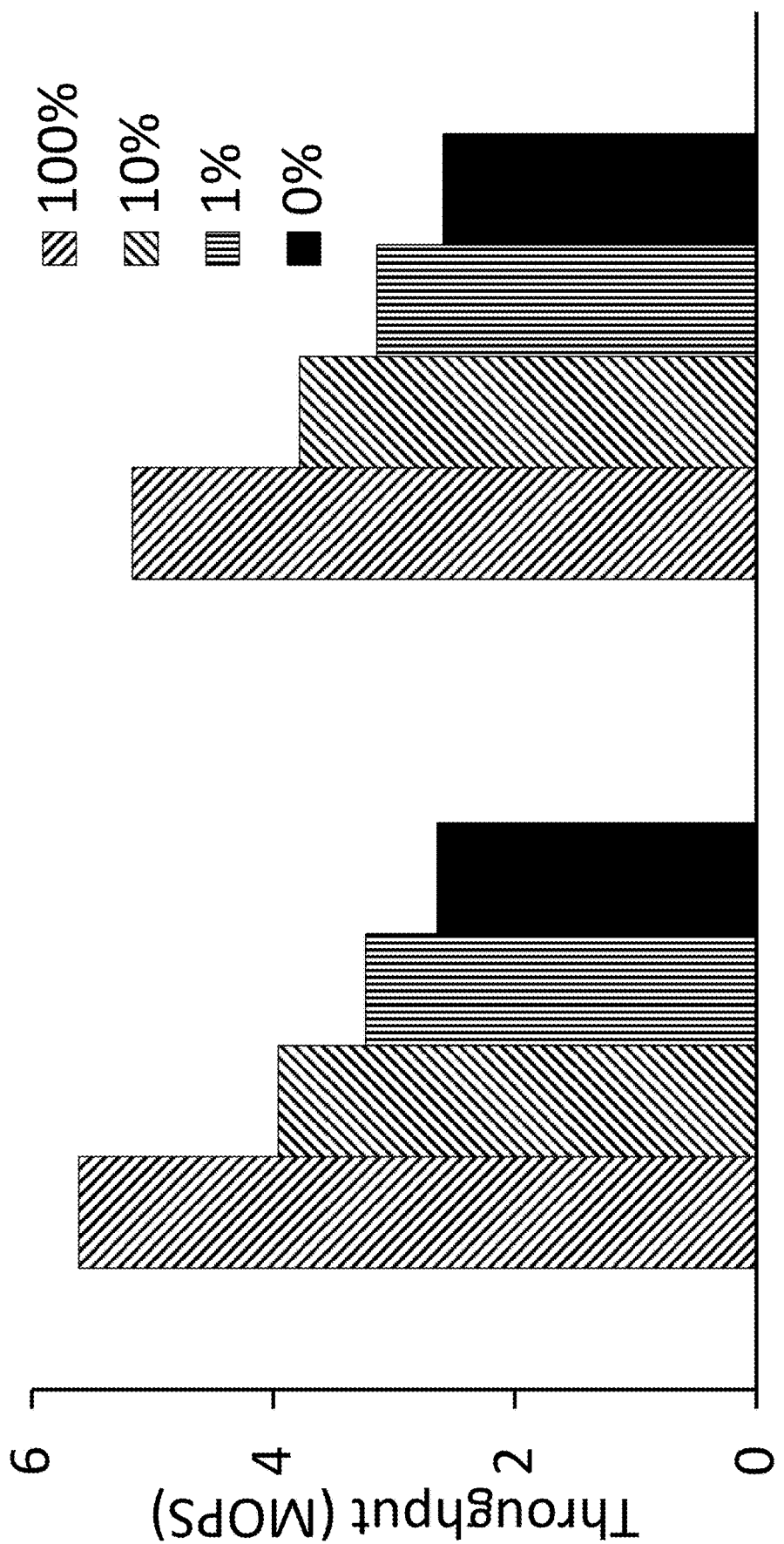
FIG. 12 provides bar graphs of the throughput with different percentages of the data cache in a coordinator for CentralDS associated with the DPM-Central of FIG. 1d.

Data at CNs is not cached because doing so would require coherence traffic, resulting in performance that is similar to distributed PM. However, it is possible to cache data at the coordinator with the DPM-Central architecture because that is the only copy and does not need any coherence traffic. By caching hot data in a coordinator, the coordinator does not need to access DPMs to get data for every read which can reduce network traffic and improve performance. A FIFO data cache is built at the coordinator for CentralDS to analyze the effect of data caching. Referring to FIG. 12, bar graphs of the throughput with different percentages of the data cache in a coordinator are shown for CentralDS. With bigger data cache, the performance increases. However, the overall performance is still limited by network bandwidth. Overall, the effect of data caching is small with CentralDS, but demands large amount of PM space at the coordinator.

Figure 13:
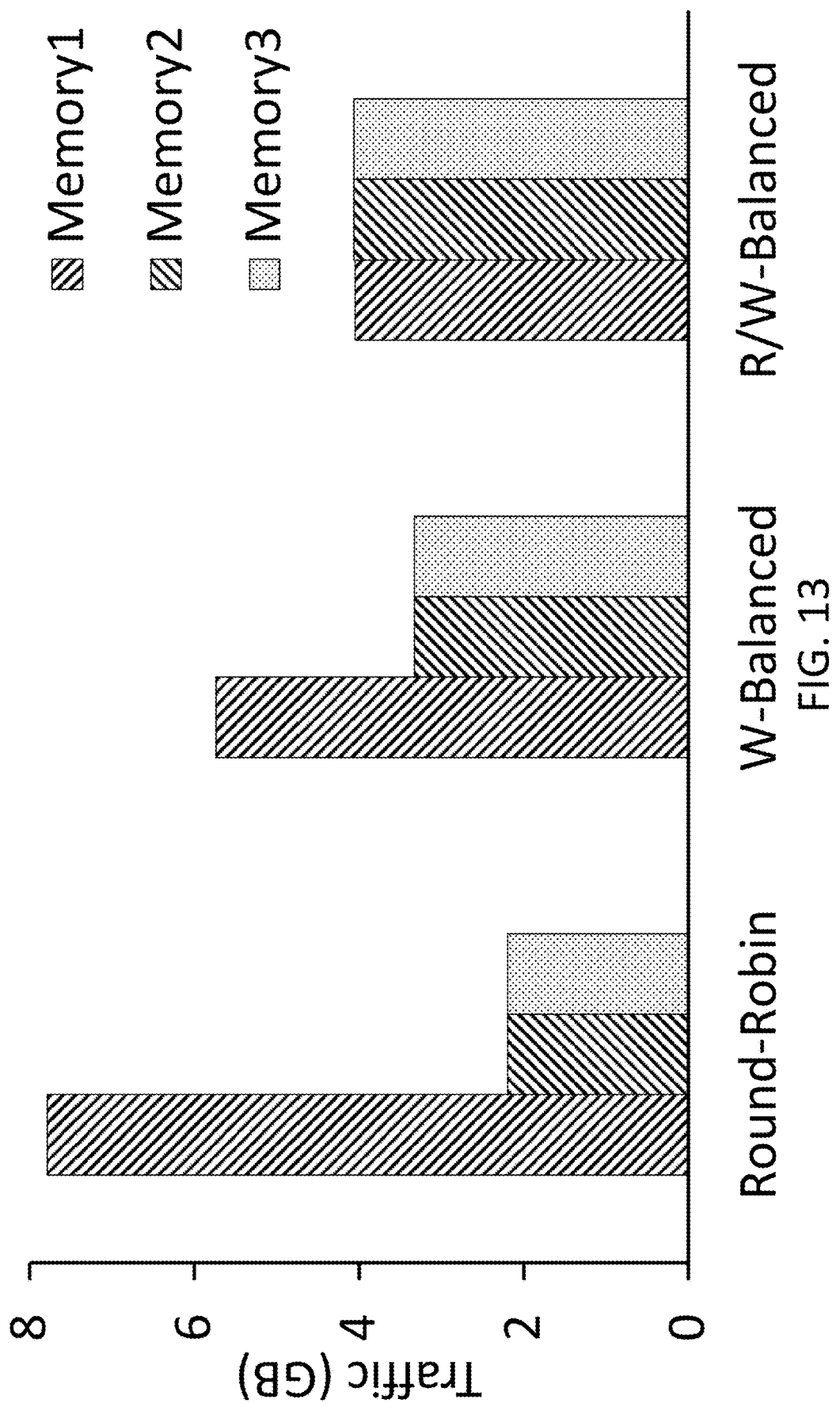
FIG. 13 provides bar graphs of load balancing in SepDS associated with the DPM-Sep of FIG. 1e for the total traffic to the three DPMs with different allocation and load-balancing policies.

To evaluate the effect of SepDS's load balancing mechanism, a synthetic workload with six data entities, a, b, and c1 to c4 is used. The workloads initially creates a (no replication) and b (with 3 replicas) and reads these two entities continuously. At a later time, it creates c1 to c4 (no replication) and keep updating them. One CN runs this synthetic workload on three DPMs. Referring to FIG. 13, bar graphs of load balancing in SepDS are shown for the total traffic to the three DPMs with different allocation and load-balancing policies. With a naive policy of assigning DPMs to new write requests in a round-robin fashion and reading from the first replica, write traffic spreads evenly across all DPMs but reads all go to DPM-1. With write load balancing, MS allocates free entries for new writes from the least accessed DPM. Doing so spreads write traffic more towards the lighter-loaded DPM-2 and DPM-3. With read load balancing, SepDS spreads read traffic across different replicas depending on the load of DPMs. As a result, the total loads across the three DPMs are completely balanced.

Those having ordinary skill in the art will recognize that numerous modifications can be made to the specific implementations described above. The implementations should not be limited to the particular limitations described. Other implementations may be possible.

The invention claimed is:

1. A method to build a persistent memory (PM)-based data storage system without involving a processor (CPU) at storage nodes, comprising:
   storing data in one or more storage nodes that only include PM and no CPUs, with data stored in PM identified by linked-lists;
   maintaining the linked-lists on a central metadata server describing locations of the data in the one or more storage nodes;
   upon request by a user to read or write data, two or more remote compute nodes contacting the central metadata server;
   obtaining shortcuts maintained on the central metadata server associated with the linked-lists associated with a data of interest;
   identifying locations of the data of interest to be read from or written to in the one or more storage nodes from the obtained shortcuts;
   identifying latest version of the data of interest by tracing the linked-list from the associated shortcut to corresponding tails; and
   accessing data stored in the one or more storage nodes' PM directly by the two or more remote compute nodes through a network.

2. The method of claim 1, wherein for reading further comprising:
   transferring data from the latest version of the data of interest in the one or more storage nodes to the two or more remote compute nodes.

3. The method of claim 2, for writing further comprising:
   selecting a new space in the one or more storage nodes' PM by the central metadata server,
   writing the desired data to the new space,
   extending the linked-list by linking the new space to the tail of the linked-list,
   setting the shortcut to the address of the new space, and
   updating the central metadata serve with the address of the new space.

4. The method of claim 1, further comprising:
   retiring data held in PM locations associated with older data by adding PM locations associated with the older data to a data structure that contains available locations for the linked-lists at the central metadata server.

5. The method of claim 1, further comprising a replication method to replicate data during the write operation to ensure correctness and accessibility of the user data when a storage node fails, the replication method comprising:
   temporarily setting a flag associated with the write operation;
   generating one or more replica of the desired data by writing the desired data into one or more storage nodes' PM, each hosting one copy of the data in a new PM space;
   each storage node linking its new PM space to the end of its associated link; and
   once the desired data has been written and linked in all storage nodes that store a copy of the data, resetting the flag.

* * * * *